US010868670B2

(12) United States Patent
Cui et al.

(10) Patent No.: US 10,868,670 B2
(45) Date of Patent: Dec. 15, 2020

(54) DATA PROCESSING METHOD AND APPARATUS

(71) Applicants: Huawei International Pte. Ltd., Singapore (SG); Singapore Management University, Singapore (SG)

(72) Inventors: Hui Cui, Singapore (SG); Robert H. Deng, Singapore (SG); Yingjiu Li, Singapore (SG); Guilin Wang, Singapore (SG); Tsz Hon Yuen, Singapore (SG)

(73) Assignees: Huawei International Pte. Ltd., Singapore (SG); Singapore Management University, Singapore (SG)

( * ) Notice: Subject to any disclaimer, the term of this patent is extended or adjusted under 35 U.S.C. 154(b) by 0 days.

(21) Appl. No.: 16/262,674

(22) Filed: Jan. 30, 2019

(65) Prior Publication Data

US 2019/0173668 A1    Jun. 6, 2019

Related U.S. Application Data

(63) Continuation of application No. PCT/SG2017/050328, filed on Jun. 30, 2017.

(30) Foreign Application Priority Data

Aug. 5, 2016    (CN) .......................... 2016 1 0640301
Mar. 9, 2017    (WO) ................. PCT/SG2017/050114

(51) Int. Cl.
*H04L 9/08*    (2006.01)
*H04L 9/16*    (2006.01)
*H04L 9/30*    (2006.01)

(52) U.S. Cl.
CPC ............... *H04L 9/083* (2013.01); *H04L 9/08* (2013.01); *H04L 9/0891* (2013.01); *H04L 9/16* (2013.01); *H04L 9/0869* (2013.01); *H04L 9/3073* (2013.01)

(58) Field of Classification Search
CPC ... H04L 9/083; H04L 9/08; H04L 9/16; H04L 9/0891; H04L 9/0869; H04L 9/3073;
(Continued)

(56) References Cited

U.S. PATENT DOCUMENTS 6,105,862 A * 8/2000 Pailles .................. G06Q 20/10
                                                    235/375
6,169,803 B1 * 1/2001 Sako ...................... G06Q 20/20
                                                    380/200
(Continued)

FOREIGN PATENT DOCUMENTS

CA    2271178 A1    7/1999
CN    1918931 A     2/2007
(Continued)

OTHER PUBLICATIONS

Yang et al: "Extended Proxy-Assisted Approach: Achieving Revocable Fine-Grained Encryption of Cloud Data," XP047412716, pp. 146-166, Springer International Publishing Switzerland, LNCS 9327 (2015).
(Continued)

*Primary Examiner* — J. Brant Murphy
(74) *Attorney, Agent, or Firm* — Leydig, Voit & Mayer, Ltd.

(57) ABSTRACT

A data processing method and apparatus include: generating, by a terminal device, a first public key and a first private key; sending the first public key to a key generation center (KGC), where the first public key is used by the KGC or a server to generate a transform key, and the transform key is
(Continued)

used by the server to transform data that is encrypted based on an attribute structure of the terminal device into data that is encrypted based on the first public key; receiving second data sent by the server, where the second data is data that is generated after the server processes first data according to the transform key; and decrypting the second data according to the first private key. In the data processing, main work is completed by the server with no need to use a secure channel to transmit a key.

19 Claims, 9 Drawing Sheets

(58) Field of Classification Search
CPC ... H04L 9/0866; H04L 63/068; H04L 9/0825; H04L 9/14
See application file for complete search history.

(56) References Cited

U.S. PATENT DOCUMENTS

| | | | |
|---|---|---|---|
| 2007/0186097 A1* | 8/2007 | Arditti | H04L 63/0823 713/156 |
| 2012/0300936 A1* | 11/2012 | Green | H04L 9/3073 380/278 |
| 2012/0324240 A1* | 12/2012 | Hattori | H04L 9/3073 713/189 |
| 2018/0026785 A1* | 1/2018 | Mori | H04L 9/0891 713/193 |
| 2018/0034641 A1* | 2/2018 | Tiwari | H04L 9/083 |

FOREIGN PATENT DOCUMENTS

| | | |
|---|---|---|
| CN | 102882685 A | 1/2013 |
| CN | 104022868 A | 9/2014 |
| CN | 104486315 A | 4/2015 |
| JP | 2009302861 A | 12/2009 |
| JP | 2015138978 A | 7/2015 |

OTHER PUBLICATIONS

Qin et al., "Server-Aided Revocable Identity-Based Encryption," XP47412037A, pp. 286-304,Springer International Publishing Switzerland, LNCS (2015).
Qin et al, "Server-Aided Revocable Identity-Based Encryption," ESORICS 2015, Part I, LNCS 9326, pp. 286-304, (2015).
Qin et al, "Attribute-Based Encryption With Efficient Verifiable Outsourced Decryption," IEEE Transactions on Information Forensics and Security, vol. 10, Issue 7, pp. 1384-1393, Institute of Electrical and Electronics Engineers—New York, New York (Jul. 2015).
Boldyreva et al, "Identity-based Encryption with Efficient Revocation," in Proceedings of the 14th ACM Conference on Computer and Communications Security, pp. 1-31, CCS 2008, ACM Press (2008).
Boneh et al, "Identity-Based Encryption from the Weil Pairing," In Crypto, vol. 2139 of Lecture Notes in Computer Science, pp. 1-31, Springer-Verlag ( 2001).
Sahai et al, "Dynamic Credentials and Ciphertext Delegation for Attribute-based Encryption," In Advances in Cryptology—Crypto 2012—32nd Annual Cryptology Conference, Santa Barbara, CA, USA, Proceedings, pp. 1-40, vol. 7417 of Lecture Notes in Computer Science, Springer (Aug. 19-23, 2012).
Attrapadung et al, "Attribute-Based Encryption Supporting Direct/Indirect Revocation Modes," In Cryptography and Coding, 12th IMA International Conference, Cryptography and Coding 2009, Cirencester, UK, Proceedings, vol. 5921 of Lecture Notes in Computer Science, pp. 278-300. Springer (Dec. 15-17, 2009).
Yang et al, "Achieving revocable fine-grained cryptographic access control over cloud data," In Information Security, 16th International Conference, ISC 2013, Dallas, Texas, USA, Proceedings, pp. 1-17, vol. 7807 of Lecture Notes in Computer Science, Springer (Nov. 13-15, 2013).
Sahai et al, "Fuzzy Identity-Based Encryption," In Advances in Cryptology—Eurocrypt 2005, 24th Annual International Conference on the Theory and Applications of Cryptographic Techniques, Aarhus, Denmark, Proceedings, pp. 1-15, vol. 3494 of Lecture Notes in Computer Science, Springer (May 22-26, 2005).
Naor et al, "Revocation and Tracing Schemes for Stateless Receivers," In Advances in Cryptology—Crypto 2001, 21st Annual International Cryptology Conference, Santa Barbara, California, USA, Aug. 19-23, 2001, pp. 1-34, Proceedings, vol. 2139 of Lecture Notes in Computer Science, Springer (Jul. 2001).
Cui et al, "Revocable and Decentralized Attribute-Based Encryption," The Computer Journal, vol. 59 No. 8, pp. 1-16, The British Computer Society (2016).
Attrapadung et al, "Conjunctive Broadcast and Attribute-Based Encryption," Pairing 2009, LNCS 5671, pp. 248-265, Conjunctive Broadcast and Attribute-Based Encryption (2009).
Horvath, "Attribute-Based Encryption Optimized for Cloud Computing," in the proceedings of SOFSEM 2015 (Editors: G.F. Italiano et al.), LNCS 8939, pp. 566-577, Laboratory of Cryptography and System Security (2015).
Rouselakis et al, "Practical Constructions and New Proof Methods for Large Universe Attribute-Based Encryption," pp. 1-12, CCS'13, Berlin, Germany (Nov. 4-8, 2013).
Seo et al, "Revocable Identity-Based Encryption Revisited: Security Model and Construction," in the 16th International Conference on Practice and Theory in Public Key Cryptography(PKC 2013), pp. 1-19 (Jan. 10, 2013).
Boneh et al, "Efficient Selective Identity-Based Encryption Without Random Oracles," pp. 1-33, J. Cryptology, 24(4), (Mar. 21, 2011).
Lewko et al, "Decentralizing Attribute-Based Encryption," In Advances in Cryptology—Eurocrypt 2011—30th Annual International Conference on the Theory and Applications of Cryptographic Techniques, Tallinn, Estonia, Proceedings, pp. 1-31, vol. 6632 of Lecture Notes in Computer Science, Springer (May 15-19, 2011).
Beimel, "Secure Schemes for Secret Sharing and Key Distribution," PhD thesis, pp. 1-115, Israel Institute of Technology, Israel Institute of Technology (Jun. 1996).
Boneh et al, "Improved Efficiency for CCA-Secure Cryptosystems Built Using Identity-Based Encryption," In CT-RSA, pp. 1-18, vol. 3376 of Lecture Notes in Computer Science, Springer (2005).
JP/2019-528015, Notice of Reasons for Rejection, dated Apr. 6, 2020.
Takashi Ito et al., "Revocation Management in Functional Encryption," Summary of 2014 Symposium on Cryptography and Information Security, Japan, The Institute of Electronics Information and Communication Engineers, (Jan. 2014) with Partial English translation.

* cited by examiner

300

---

A terminal device generates a first public key and a first private key, where the first public key is used to encrypt data, and the first private key is used to decrypt the data that is encrypted by using the first public key — S310

The terminal device sends the first public key to a key generation center KGC, where the first public key is used by the KGC or a server to generate a transform key, the transform key is used by the server to transform data that is encrypted based on an attribute structure of the terminal device into the data that is encrypted based on the first public key, and the attribute structure is used to indicate a condition that needs to be satisfied for accessing data — S320

The terminal device receives second data sent by the server, where the second data is data that is generated after the server processes first data according to the transform key, and the first data is data that is encrypted based on the attribute structure of the terminal device and that is obtained by the server — S330

The terminal device decrypts the second data according to the first private key — S340

A server receives a second public key from a key generation center KGC, where the second public key is used to transform data that is encrypted based on an attribute structure of a terminal device into data that is encrypted based on a first public key generated by the terminal device, so that the terminal device decrypts, according to a first private key generated by the terminal device, the data that is encrypted by using the first public key, where the attribute structure is used to indicate a condition that needs to be satisfied for accessing data — S510

The server obtains first data, where the first data is data that is encrypted based on the attribute structure of the terminal device — S520

The server transforms the first data into second data according to the second public key, where the second data is the data that is encrypted based on the first public key — S530

The server sends the second data to the terminal device, so that the terminal device decrypts the second data according to the first private key — S540

FIG. 5

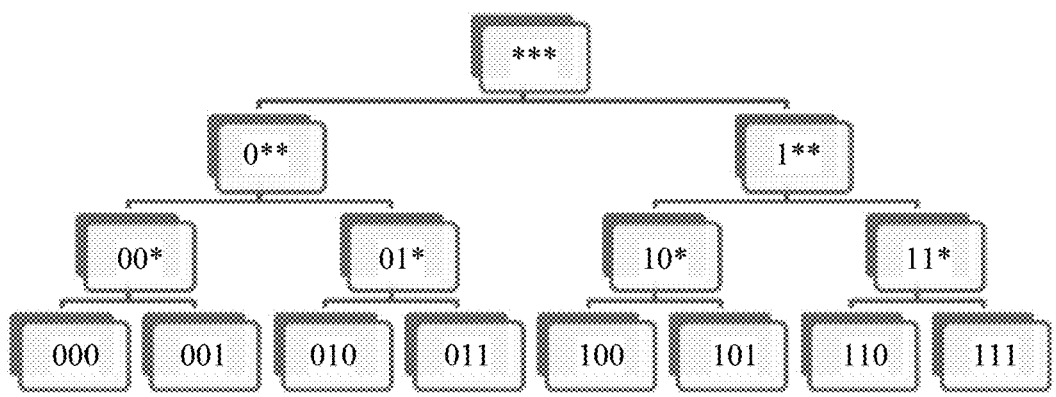

FIG. 6

DATA PROCESSING METHOD AND APPARATUS

CROSS-REFERENCE TO RELATED APPLICATIONS

This application is a continuation of International Application No. PCT/SG2017/050328, filed on Jun. 30, 2017, which claims priority to International Application No. PCT/SG2017/050114, filed on Mar. 9, 2017, and claims priority to Chinese Patent Application No. 201610640301.X, filed on Aug. 5, 2016. The disclosures of the aforementioned applications are hereby incorporated by reference in their entireties.

TECHNICAL FIELD

The present application relates to the communications field, and in particular, to a data processing method and apparatus.

BACKGROUND

Attribute-Based Encryption (ABE) is a data processing scheme in which encryption is performed based on an attribute. An ABE system may serve a large quantity of data users, for brevity, referred to as "users" for short below. Some users need to be revoked for such reasons as disclosure of a private key or user resignation from office. Indirect revocation is a frequently used ABE revocation method in which a Key Generation Center (KGC) periodically performs a key update task, so that a revoked user cannot obtain a private key for a next period and therefore cannot decrypt data.

At present, a user needs to periodically contact the KGC to obtain an updated key. Therefore, key update information causes relatively high overheads for the user. In addition, the KGC needs to be on line all the time, to send key information to users by using a secure channel, and a size of a key is related to a quantity of users in the system. This imposes relatively high requirements on performance and a user processing capability of the ABE system.

SUMMARY

In view of this, embodiments of the present application provide a data processing method and apparatus. A server unnecessary to be trustworthy is used in a conventional ABE system, and the server can act as an agent to perform a task such as key updating resulting from user revocation, so as to reduce a computation amount of a user processor, so that a user with a limited processing capability can quickly access attribute-based encryption data stored in a cloud platform or another platform. In addition, a secure channel does not need to be used to transmit a key, thereby reducing a requirement for performance of the ABE system.

According to one aspect, an embodiment of the present application provides a data processing method, where the method includes: generating, by a terminal device, a first public key and a first private key, where the first public key is used to encrypt data, and the first private key is used to decrypt the data that is encrypted by using the first public key; sending, by the terminal device, the first public key to a key generation center KGC, where the first public key is used by the KGC or a server to generate a transform key, the transform key is used by the server to transform data that is encrypted based on an attribute structure of the terminal device into the data that is encrypted based on the first public key, and the attribute structure is used to indicate a condition that needs to be satisfied for accessing data; receiving, by the terminal device, second data sent by the server, where the second data is data that is generated after the server processes first data according to the transform key, and the first data is the data that is encrypted based on the attribute structure of the terminal device and that is obtained by the server; and decrypting, by the terminal device, the second data according to the first private key.

According to the data processing method provided in this embodiment of the present application, the terminal device generates the first public key and the first private key, where the first public key is used to encrypt data, and the first private key is used to decrypt the data that is encrypted by using the first public key. The terminal device sends the first public key to the KGC, so that the KGC or the server generates the transform key according to the first public key, where the first public key is nested within the transform key. Therefore, after the server processes, by using the transform key, the ciphertext that is encrypted based on the attribute structure of the terminal device, what is generated is the ciphertext that is encrypted by using the first public key. The terminal device stores the first private key paired with the first public key. After receiving a partially decrypted ciphertext sent by the server, the terminal device may perform decryption according to the first private key and a decryption algorithm, to generate a plaintext. Because the first private key is stored in the terminal device all the time, and the first private key does not need to be sent to another device, a secure channel does not need to be used in the data processing method in this embodiment of the present application. In addition, because what is obtained after the server processes the first data is still a ciphertext, another device is unable to obtain the final plaintext even if the server conspires with the another device. Therefore, the data processing method in this embodiment of the present application imposes no requirement on security performance of the server. Moreover, the first private key in this embodiment of the present application may be a constant, and the terminal device only needs to perform one exponentiation operation when performing a decryption operation according to the first private key, to obtain the plaintext. This avoids a bilinear pairing operation for which a large quantity of computing resources are consumed in another technical solution, thereby reducing a requirement for a processing capability of the terminal device, and improving resource utilization of the terminal device.

Optionally, the sending, by the terminal device, the first public key to a KGC includes: sending, by the terminal device, the first public key and certification information to the KGC, where the certification information is used to indicate that the terminal device stores the first private key.

When sending the first public key to the KGC, the terminal device may further send the certification information to the KGC, where the certification information is used to indicate that the terminal device stores the first private key paired with the first public key. In this case, the KGC may determine, according to the certification information, to generate the transform key. If the KGC receives no certification information, the KGC may consider that the first public key is an unauthorized public key, and terminates subsequent processing on the first public key. This can improve security performance of an ABE system.

Optionally, the generating, by a terminal device, a first public key and a first private key includes: generating, by the terminal device, the first public key and the first private key according to a system parameter and an identity parameter, where the system parameter is public information generated by the KGC, and the identity parameter is identification information of the terminal device.

Optionally, the decrypting, by the terminal device, the second data according to the first private key includes: decrypting, by the terminal device, the second data according to the system parameter, the identity parameter, and the first private key.

According to another aspect, an embodiment of the present application provides a data processing method, where the method includes: receiving, by a key generation center KGC, a first public key from a terminal device, where the first public key is used to encrypt data; generating, by the KGC, a second public key according to the first public key and attribute information of the terminal device, where the second public key is used by the server to transform data that is encrypted based on the attribute structure of the terminal device into data that is encrypted based on the first public key, so that the terminal device decrypts, according to a first private key generated by the terminal device, the data that is encrypted based on the first public key, where the attribute structure is used to indicate a condition that needs to be satisfied for accessing data; and sending, by the KGC, the second public key to the server.

After receiving the first public key sent by the terminal device, the KGC may generate the second public key based on the first public key and the attribute of the terminal device. The second public key is a public key based on the attribute of the terminal device, and may be used to decrypt data that is encrypted based on the attribute of the terminal device. Because the first public key is nested within the second public key, after the data that is encrypted based on the attribute of the terminal device is processed by using the second public key, generated data is the ciphertext that is encrypted based on the first public key. The terminal device may use the first private key stored in the terminal device, to decrypt the ciphertext that is encrypted based on the first public key. The first private key is a key paired with the first public key, and may be used to decrypt the data that is encrypted based on the first public key. In this embodiment of the present application, the attribute information of the terminal device may be specific identity information of the terminal device, and the KGC may further generate the second public key according to the first public key and an attribute set of the terminal device.

Because the first private key is stored in the terminal device all the time, and the first private key does not need to be sent to another device, a secure channel does not need to be used in the data processing method in this embodiment of the present application. In addition, because what is obtained after the server processes the first data is still a ciphertext, another device is unable to obtain the final plaintext even if the server conspires with the another device. Therefore, the data processing method in this embodiment of the present application imposes no requirement on security performance of the server. Moreover, the first private key in this embodiment of the present application may be a constant, and the terminal device only needs to perform one exponentiation operation when performing a decryption operation according to the first private key, to obtain the plaintext. This avoids a bilinear pairing operation for which a large quantity of computing resources are consumed in another technical solution, thereby reducing a requirement for a processing capability of the terminal device, and improving resource utilization of the terminal device.

Optionally, after the generating, by the KGC, a second public key, the method further includes:
generating, by the KGC, a transform key or an error prompt according to the second public key and key update information, where the key update information is used to indicate whether the terminal device is revoked; and when the key update information indicates that the terminal device is revoked, generating, by the KGC, the error prompt according to the second public key and the key update information; or when the key update information indicates that the terminal device is not revoked, generating, by the KGC, the transform key according to the second public key and the key update information, where the transform key is used by the server to transform the data that is encrypted based on the attribute of the terminal device into the data that is encrypted based on the first public key, so that the terminal device decrypts, according to the first private key generated by the terminal device, a result of the transform using the transform key; and the sending, by the KGC, the second public key to the server includes: sending, by the KGC, the transform key to the server; or sending, by the KGC, the second public key and the key update information to the server, so that the server generates the transform key or the error prompt according to the second public key and the key update information.

According to the data processing method in this embodiment of the present application, the key update information that is used to indicate whether the terminal device is revoked is generated by the KGC, and the transform key or the error prompt is generated according to the key update information and the second public key, so that it can be ensured that a terminal device that is not revoked can obtain encrypted data, and a terminal device that is revoked cannot obtain encrypted data. This improves security performance of a system.

Optionally, before the sending, by the KGC, a second public key, the method further includes: receiving, by the KGC, certification information from the terminal device, where the certification information is used to indicate that the terminal device stores the first private key; and determining, according to the certification information, to generate the second public key.

When sending the first public key to the KGC, the terminal device may further send the certification information to the KGC, where the certification information is used to indicate that the terminal device stores the first private key paired with the first public key. In this case, the KGC may determine, according to the certification information, to generate the second public key. If the KGC receives no certification information, the KGC may consider that the first public key is an unauthorized public key, and terminates subsequent processing on the first public key. This can improve security performance of an ABE system.

Optionally, the generating, by the KGC, a second public key according to the first public key and attribute information of the terminal device includes: generating, by the KGC, the second public key and updated internal state information according to the first public key, the attribute information of the terminal device, a system parameter, a master key, and internal state information of the KGC, where the system parameter is public information generated by the KGC, and the master key is a private key generated by the KGC.

Optionally, the generating, by the KGC, the transform key according to the second public key and the key update information includes: generating, by the KGC, the transform key according to the second public key, the key update information, the system parameter, and the identity parameter, where the key update information indicates that the terminal device is not revoked.

According to still another aspect, an embodiment of the present application provides a data processing method, where the method includes: receiving, by a server, a second public key from a key generation center KGC, where the second public key is used to transform data that is encrypted based on an attribute structure of a terminal device into data that is encrypted based on a first public key generated by the terminal device, so that the terminal device decrypts, according to a first private key generated by the terminal device, the data that is encrypted by using the first public key, where the attribute structure is used to indicate a condition that needs to be satisfied for accessing data; obtaining, by the server, first data, where the first data is the data that is encrypted based on the attribute structure of the terminal device; transforming, by the server, the first data into second data according to the second public key, where the second data is the data that is encrypted based on the first public key; and sending, by the server, the second data to the terminal device, so that the terminal device decrypts the second data according to the first private key.

In the data processing method provided in this embodiment of the present application, the second public key is a public key generated by the KGC based on the first public key and the attribute information of the terminal device; the second public key is a public key based on the attribute of the terminal device, and may be used to decrypt data that is encrypted based on the attribute of the terminal device. Because the first public key is nested within the second public key, after the data that is encrypted based on the attribute of the terminal device is processed by using the second public key, generated data is the ciphertext that is encrypted based on the first public key. The terminal device may use the first private key stored in the terminal device, to decrypt the second data. The first private key is a key generated by the terminal device, and may be used to decrypt the data that is encrypted based on the first public key.

Because the first private key is stored in the terminal device all the time, and the first private key does not need to be sent to another device, a secure channel does not need to be used in the data processing method in this embodiment of the present application. In addition, because what is obtained after the server processes the first data is still a ciphertext, another device is unable to obtain the final plaintext even if the server conspires with the another device. Therefore, the data processing method in this embodiment of the present application imposes no requirement on security performance of the server. Moreover, the first private key in this embodiment of the present application may be a constant, and the terminal device only needs to perform one exponentiation operation when performing a decryption operation according to the first private key, to obtain the plaintext. This avoids a bilinear pairing operation for which a large quantity of computing resources are consumed in another technical solution, thereby reducing a requirement for a processing capability of the terminal device, and improving resource utilization of the terminal device.

Optionally, after the receiving, by a server, a second public key, the method further includes: receiving, by the server, key update information from the KGC, where the key update information is used to indicate whether the terminal device is revoked; generating, by the server, a transform key or an error prompt according to the second public key and the key update information; when the key update information indicates that the terminal device is revoked, generating, by the server, the error prompt according to the second public key and the key update information; or when the key update information indicates that the terminal device is not revoked, generating, by the server, the transform key according to the second public key and the key update information, where the transform key is used by the server to transform the data that is encrypted based on the attribute structure of the terminal device into the data that is encrypted based on the first public key, so that the terminal device decrypts, according to the first private key generated by the terminal device, the data that is encrypted by using the first public key; and the transforming, by the server, the first data into second data according to the second public key includes: transforming, by the server, the first data into the second data according to the transform key.

According to the data processing method in this embodiment of the present application, the key update information that is used to indicate whether the terminal device is revoked and that is generated by the KGC is received, and the transform key or the error result is generated according to the key update information and the second public key, so that it can be ensured that a terminal device that is not revoked can obtain encrypted data, and a terminal device that is revoked cannot obtain encrypted data. This improves security performance of a system.

Optionally, the generating, by the server, the transform key according to the second public key and the key update information includes: generating, by the server, the transform key according to the second public key, the key update information, a system parameter, and an identity parameter, where the system parameter is public information generated by the KGC, and the identity parameter is identification information of the terminal device.

Optionally, the transforming, by the server, the first data into the second data according to the transform key includes: transforming, by the server, the first data into the second data according to the transform key, the system parameter, the attribute information of the terminal device, the identity parameter, and a time parameter, where the system parameter is the public information generated by the KGC, the identity parameter is the identification information of the terminal device, and the time parameter is used to indicate a time during which the server is allowed to use the transform key.

According to still another aspect, an embodiment of the present application provides a data processing apparatus. The apparatus can implement a function executed by the terminal device in the methods in the foregoing aspects. The function may be implemented by hardware, or may be implemented by using hardware to execute related software. The hardware or software includes one or more units or modules corresponding to the foregoing function.

In a possible design, in a structure of the apparatus, a processor and a communications interface are included. The processor is configured to support the apparatus in executing a corresponding function of the terminal device in the foregoing methods. The communications interface is configured to support communication between the apparatus and another apparatus. The apparatus may further include a memory. The memory is configured to be coupled with the processor and stores a program instruction and data that are necessary for the apparatus.

According to still another aspect, an embodiment of the present application provides a data processing apparatus. The apparatus can implement a function executed by the KGC in the methods in the foregoing aspects. The function may be implemented by hardware, or may be implemented by using hardware to execute related software. The hardware or software includes one or more units or modules corresponding to the foregoing function.

In a possible design, in a structure of the apparatus, a processor and a communications interface are included. The processor is configured to support the apparatus in executing a corresponding function of the KGC in the foregoing methods. The communications interface is configured to support communication between the apparatus and another apparatus. The apparatus may further include a memory. The memory is configured to be coupled with the processor and stores a program instruction and data that are necessary for the apparatus.

According to still another aspect, an embodiment of the present application provides a data processing apparatus. The apparatus can implement a function executed by the server in the methods in the foregoing aspects. The function may be implemented by hardware, or may be implemented by using hardware to execute related software. The hardware or software includes one or more units or modules corresponding to the foregoing function.

In a possible design, in a structure of the apparatus, a processor and a communications interface are included. The processor is configured to support the apparatus in executing a corresponding function of the server in the foregoing methods. The communications interface is configured to support communication between the apparatus and another apparatus. The apparatus may further include a memory. The memory is configured to be coupled with the processor and stores a program instruction and data that are necessary for the apparatus.

According to still another aspect, an embodiment of the present application provides a data processing apparatus. The apparatus includes the KGC and the server that are described in the foregoing aspects.

According to still another aspect, an embodiment of the present application provides a communications system. The communications system includes the terminal device, the KGC, and the server that are described in the foregoing aspects.

According to still another aspect, an embodiment of the present application provides a computer storage medium. The computer storage medium is configured to store a computer software instruction for use of the terminal device, and contains a program designed for executing the foregoing aspects.

According to still another aspect, an embodiment of the present application provides a computer storage medium. The computer storage medium is configured to store a computer software instruction for use of the KGC, and contains a program designed for executing the foregoing aspects.

According to still another aspect, an embodiment of the present application provides a computer storage medium. The computer storage medium is configured to store a computer software instruction for use of the server, and contains a program designed for executing the foregoing aspects.

In comparison with the prior art, according to the data processing method provided in the embodiments of the present application, because the terminal device does not need to send, to another device, a key required to entirely decrypt a ciphertext, a secure channel does not need to be used in the data processing method in this embodiment of the present application. In addition, because what is obtained after the server processes the first data is still a ciphertext, another device is unable to obtain the final plaintext even if the server conspires with the another device. Therefore, the data processing method in this embodiment of the present application imposes no requirement on security performance of the server. Moreover, the first private key in this embodiment of the present application may be a constant, and the terminal device only needs to perform one exponentiation operation when performing a decryption operation according to the first private key, to obtain the plaintext. This avoids a bilinear pairing operation for which a large quantity of computing resources are consumed in another technical solution, thereby reducing a requirement for a processing capability of the terminal device, and improving resource utilization of the terminal device.

BRIEF DESCRIPTION OF DRAWINGS

To describe the technical solutions in the embodiments of the present application more clearly, the following briefly describes the accompanying drawings required for describing the embodiments of the present application. Apparently, the accompanying drawings in the following description show merely some embodiments of the present application, and a person of ordinary skill in the art may still derive other drawings from these accompanying drawings without creative efforts.

FIG. 3 is a schematic diagram of a data processing method according to an embodiment of the present application;

FIG. 5 is a schematic diagram of still another data processing method according to an embodiment of the present application;

FIG. 6 is a schematic diagram of a binary tree to which an embodiment of the present application is applicable;

DESCRIPTION OF EMBODIMENTS

To make the purpose, technical solutions, and advantages of the embodiments of the present application clearer, the following describes the technical solutions of the embodiments of the present application with reference to the accompanying drawings in the embodiments of the present application.

A system architecture and a service scenario that are described in the embodiments of the present application are intended to describe the technical solutions in the embodiments of the present application more clearly, and do not constitute any limitation on the technical solutions provided in the embodiments of the present application. A person of ordinary skill in the art can know that with evolution of the system architecture and emergence of a new service scenario, the technical solutions provided in the embodiments of the present application are also applicable to similar technical issues.

Figure 1:
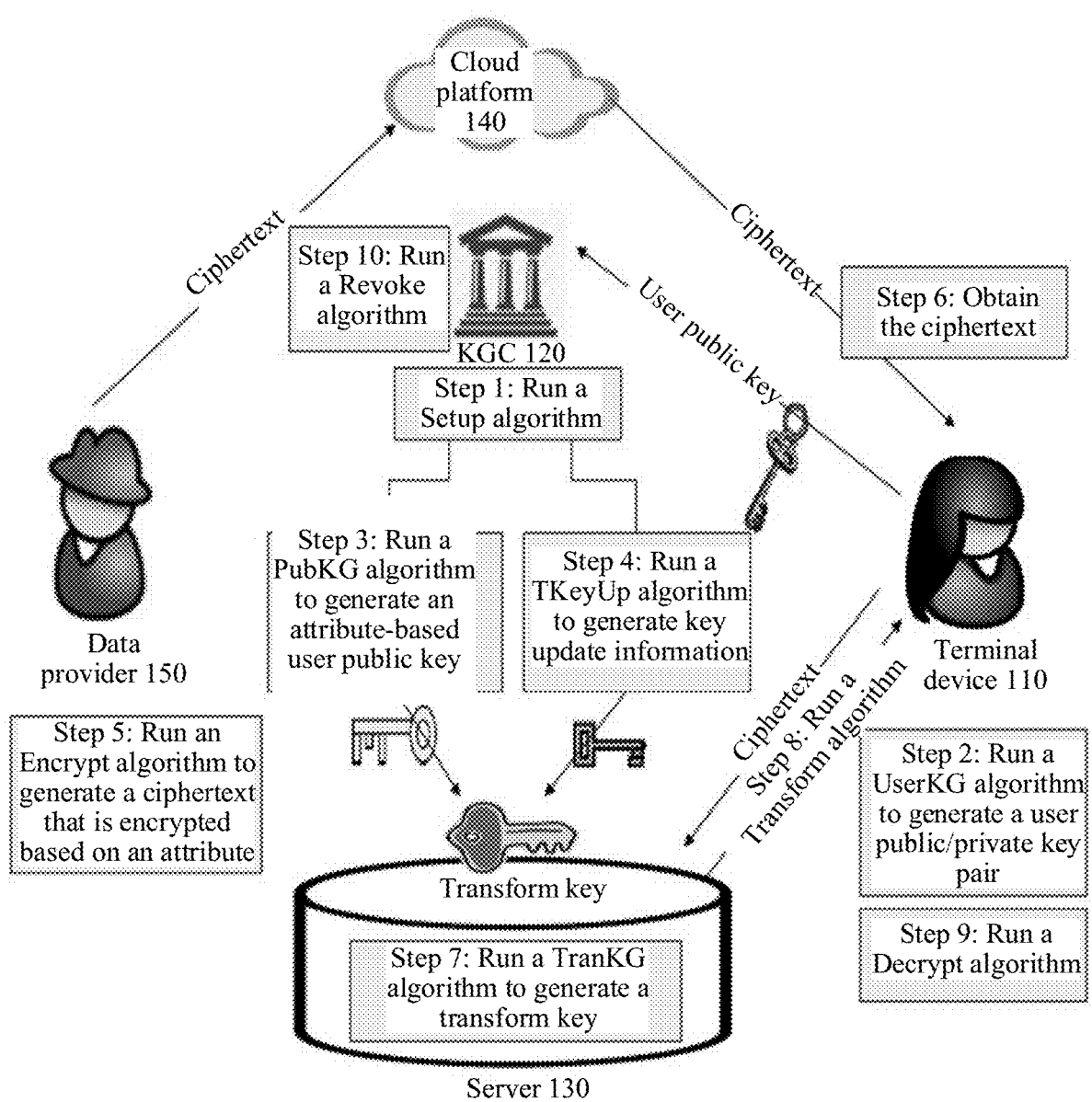
FIG. 1 is a possible schematic diagram of a system architecture to which an embodiment of the present application is applicable.

FIG. 1 is a schematic diagram of an SR-ABE (server-aided revocable attribute-based encryption) system architecture according to an embodiment of the present application. As shown in FIG. 1, the system architecture includes a terminal device (that is, a data user) 110, a KGC 120, a server 130, a cloud platform 140, and a data provider 150. A possible workflow of the system architecture is described as follows:

Step 1: The KGC 120 runs a Setup (initialization) algorithm during system initialization to generate a system public parameter.

Step 2: The terminal device 110 runs a UserKG (user key generation) algorithm to generate a user public/private key pair, where the user private key may be used to decrypt data that is encrypted by using the user public key; and the terminal device 110 stores the user private key, and sends the user public key to the KGC 120.

Step 3: The KGC 120 generates an attributed-based public key according to the user public key, the system public parameter, attribute information of the terminal device 110, and a PubKG (public key generation) algorithm, and sends the attribute-based public key to the server 130.

Step 4: The KGC 120 periodically runs a TKeyUp (key updating) algorithm to generate key update information for the terminal device 110, and sends the key update information to the server 130.

Step 5: The data provider 150 runs an Encrypt (encryption) algorithm to encrypt, according to a specified access structure and a time period value, data provided by the data provider 150, and uploads a ciphertext generated through encryption to the cloud platform 140, where the access structure is an attribute-based access structure.

Step 6: The terminal device 110 obtains the ciphertext from the cloud platform 140, and forwards the ciphertext to the server 130.

Step 7: If the key update information indicates that the terminal device 110 is not revoked, the server 130 may generate a transform key according to the attribute-based public key and the key update information by using a TranKG (transform key generation) algorithm, where the transform key is used to process the ciphertext.

Step 8: The server 130 runs a Transform algorithm according to the transform key to partially decrypt the ciphertext obtained from the terminal device 110, and sends a result of the partial decryption to the terminal device 110, where the attribute of the terminal device 110 satisfies a requirement of the access structure of the ciphertext.

Step 9: The terminal device 110 runs a Decrypt (decryption) algorithm according to the stored user private key, to entirely decrypt the result of the partial decryption to generate a plaintext.

Step 10: If the terminal device 110 needs to be revoked, the KGC 120 may run a Revoke (revocation) algorithm to generate updated key update information, where the updated key update information indicates that the terminal device 110 is revoked, so that the server cannot generate a transform key according to the public key that is based on the attribute of the terminal device 110 and the terminal device 110 cannot continue obtaining data.

In the system architecture shown in FIG. 1, the transform key is a key generated based on the user public key of the terminal device 110. Therefore, after the server 130 performs, by using the transform key, transform processing on a ciphertext that is encrypted based on the attribute, the partially decrypted ciphertext that is generated is a ciphertext that is encrypted based on the user public key, and the partially decrypted ciphertext can be decrypted only by using the user private key stored in the terminal device 110. In this way, even if the partially decrypted ciphertext is obtained by another device, the another device still cannot decrypt the ciphertext, so that data security is ensured.

The foregoing system architecture to which this embodiment of the present application is applicable is merely an example for description, and this embodiment of the present application may also be applied to another system architecture. For example, the KGC 120 and the server 130 shown in FIG. 1 may act as different functional modules of a hardware device in some scenarios. For another example, the terminal device 110 may send indication information to the server 130, where the indication information is used to indicate a ciphertext required by the terminal device 110; and the server 130 may obtain the corresponding ciphertext from the cloud platform 140 according to the indication information.

It should also be understood that, a quantity and names of devices or modules shown in FIG. 1 are merely examples, and do not mean that an application scenario in this embodiment of the present application is limited to the scenario shown in FIG. 1.

For ease of understanding this embodiment of the present application, the following first briefly describes elements related to the present application.

Bilinear pairing: G and $G_1$ are two multiplicative groups whose order is a prime number p, and g is a generator of G. An efficiently computable map $\hat{e}: G \times G \to G_1$, if satisfying the following conditions, is referred to as a bilinear pairing map.

Bilinearity: For any $a, b \in Z^*_p$, $\hat{e}(g^a, g^b) = \hat{e}(g,g)^{ab}$ holds true.

Non-degeneration: $\hat{e}(g,g) \neq 1$ holds true, where 1 is an identity element of $G_1$.

Deterministic (q-1) assumption: For any probabilistic polynomial time algorithm, it is assumed that $\vec{y}$ equals:

$$g, g_\mu, g^{1/a},$$

$$\{g^{a^i}, g^{b_j}, g^{\mu b_j}, g^{a^i b_j}, g^{a^i/b_j^2} | \forall i \in [q], j \in [q]\},$$

$$\{g^{a^i/b_j} | \forall i \in [2q], j \in [q], i \neq q+1\},$$

$$\{g^{a^i/b_j} | \forall i \in [2q], j \in [q], i \neq q+1\},$$

$$\{g^{a^i b_j/b_{j'}^2} | \forall i \in [2q], j \in [q], j' \in [q], j \neq j'\}, \text{ and}$$

$$\{g^{\mu a^i b_j/b_{j'}}, g^{a^i b_j/b_{j'}^2} | \forall i \in [q], j \in [q], j' \in [q], j \neq j'\}.$$

For this algorithm, it is difficult to distinguish between $(\vec{y}, \hat{e}(g,g)^{a^{q+1}\mu})$ and $(\vec{y}, Z)$. Herein, q is a given integer, g is a generator of the group G, $Z \in G_1$, a, $\mu$, $b_1$, ..., and $b_q$ belong to $Z^*_p$ and are random numbers that are independently and uniformly selected, and $\hat{e}: G \times G \to G_1$ is a computable bilinear pairing map.

Access structure: Let P={$P_1, \ldots, P_n$} be a set of parties. That a group $A \subseteq 2^{\{P_1, \ldots, P_n\}}$ is described as being monotonic means that the group satisfies the following condition: For any two subsets B and C of P, C∈A holds true provided that B∈A and B⊆C. A monotonic access structure is a monotonic group A including non-empty subsets of P, that is, $A \subseteq 2^{\{P_1, \ldots, P_n\}} \setminus \{\emptyset\}$. Elements in the group A are referred to as an authorized set, and elements that are a subset of P but are not in the group A are referred to as an unauthorized set.

LSSS: (linear secret sharing scheme): Let P={P1, ..., Pn} be a set of parties, M be a matrix with l rows and n columns, and ρ:{1, ..., l}→P be a labeling function in which each row of the matrix M is mapped to a party of P. A secret sharing scheme II for the set P of parties is a linear secret sharing scheme over $Z_p$, satisfying the following condition:

A secret share of each party of P is a vector in $Z_p$; and there is one matrix M (referred to as a share-generating matrix in the secret sharing scheme II) with l rows and n columns making true that, for x=1, ..., l, an $x^{th}$ row of the matrix M is corresponding to a party ρ(i) by using the labeling function ρ. For a secret μ that belongs to $Z_p$ and that needs to be shared and randomly selected numbers $r_2, \ldots,$ and $r_n$ that belong to $Z_p$, a column vector is denoted by $\vec{v} = (\mu, r_2, \ldots, r_n)$. In this case, $M\vec{v}$ indicates l secret shares obtained after the secret μ is shared in the secret sharing scheme II. $(M\vec{v})_i$ is a share obtained for the party ρ(i).

Each LSSS is characterized by linear restoration. It is assumed that II represents a linear secret sharing scheme corresponding to an access structure A. For an authorized set A, an index set is defined as I={i|ρ(i)∈A}⊆{1, ... l}. In this case, a vector (1, 0, ..., 0) is in space formed after rows of the matrix M that are indexed by the index set I are expanded, and a constant set $\{w_i \in Z_p\}_{p \in_{i \in I}}$ makes true that, for any valid secret share $\{v_i\}$, of a secret μ, generated according to the II, the secret μ can be restored according to $$\sum_{i \in I} w_i v_i = \mu.$$

In addition, these constant set $\{w_i\}$ can be computed within a polynomial time that amounts to a size of the share-generating matrix M.

In contrast, for an unauthorized set A', there is no such constant set $\{w_i\}$. Further, let I' be $\{i | \rho(i) \in A'\}$, there is a vector $\vec{w}$ making true that a first component $w_1$ of the vector $\vec{w}$ may be any non-zero element in $Z_p$ but $<M_i, \vec{w}>$ equals 0 for any i that belongs to 1'. Herein, $M_i$ is an $i^{th}$ row of the matrix M.

An access control policy may be described by using a monotonic Boolean expression. An access structure of a linear secret sharing scheme (LSSS) is more generalized, and can be derived from a Boolean expression. In other words, there is a standard method used to transform any monotonic Boolean expression into a corresponding share-generating matrix M in the linear secret sharing scheme. In addition, the Boolean expression may be described as an access control tree whose internal nodes are corresponding to an AND gate and an OR gate whose leaf nodes are corresponding to attributes. A corresponding quantity of rows of the share-generating matrix M in the LSSS secret sharing scheme is a quantity of leaf nodes in the access control tree, that is, a total of attributes.

Binary Tree and KUNodes Algorithm

Figure 2:
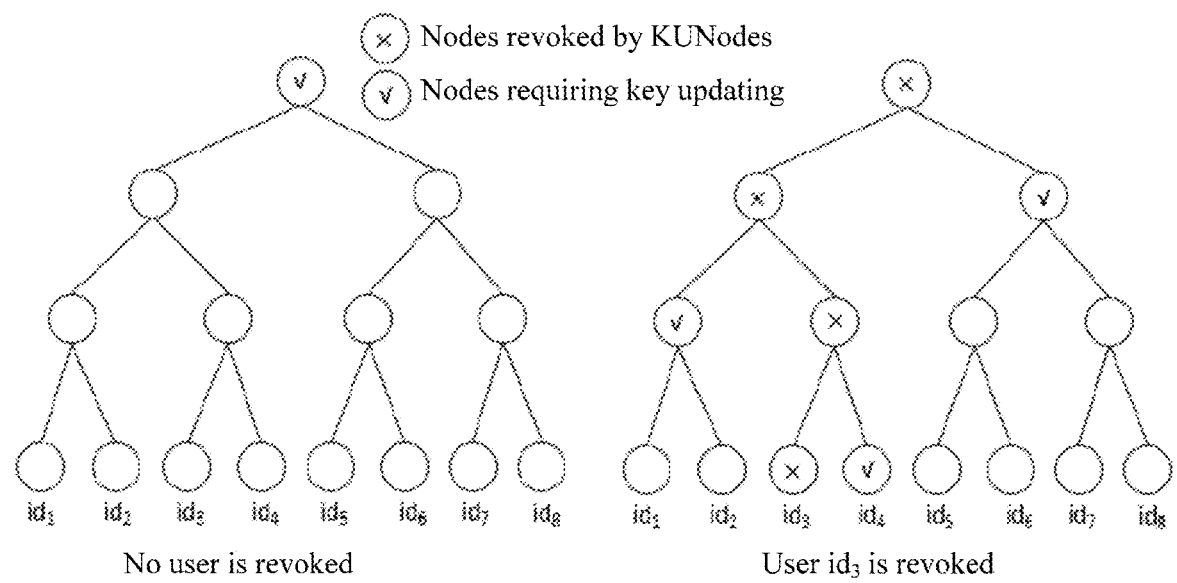
FIG. 2 is a schematic diagram of a KUNodes algorithm to which an embodiment of the present application is applicable.

As shown in FIG. 2, BT denotes a binary tree having N leaf nodes that are corresponding to N users. Let root be a root node of the binary tree BT. For a leaf node θ, Path(θ) is used to indicate a set of all nodes (including θ and root) in a path from θ to root. If θ is not a leaf node, $θ_l$ and $θ_r$ are respectively used to indicate a left subnode and a right subnode of θ. It is assumed that all nodes in the tree are uniquely encoded as character strings, and the tree is defined by expressions of the nodes of the tree. The KUNodes algorithm is used to compute a minimum node set on which key updating needs to be performed, so that only a user that is not revoked within a time period t can decrypt a ciphertext generated within the time period. The binary tree BT, a revocation list rl, and the time period value t are input to the algorithm, and the minimum node set in the BT is output, so that for any node in the revocation list rl, any ancestor of the node (including the node itself) is not in the set, and for another node (that is, all nodes that have not been revoked), there is only one ancestor (including the another node itself) in the set. It is noted that the revocation list rl corresponding to the time period t includes all users that have been revoked in the time period and before the time period. FIG. 2 shows a schematic workflow of the KUNodes algorithm. According to the algorithm, all ancestor nodes of all revoked nodes are first marked as revoked nodes, and then non-revoked subnodes of these revoked nodes are output. The KUNodes algorithm is strictly described as follows:

KUNodes(BT, rl, t)
X, Y←ø.
$\forall (\theta_i, t_i) \in$ rl, if $t_i \le t$, then add Path(a) to X.
$\forall x \in X$, if $x_l \notin X$, then add $x_l$ to Y; if $x_r \notin X$, then add $x_r$ to Y.
If Y=ø, then add root to Y.
Return Y.

Figure 4:
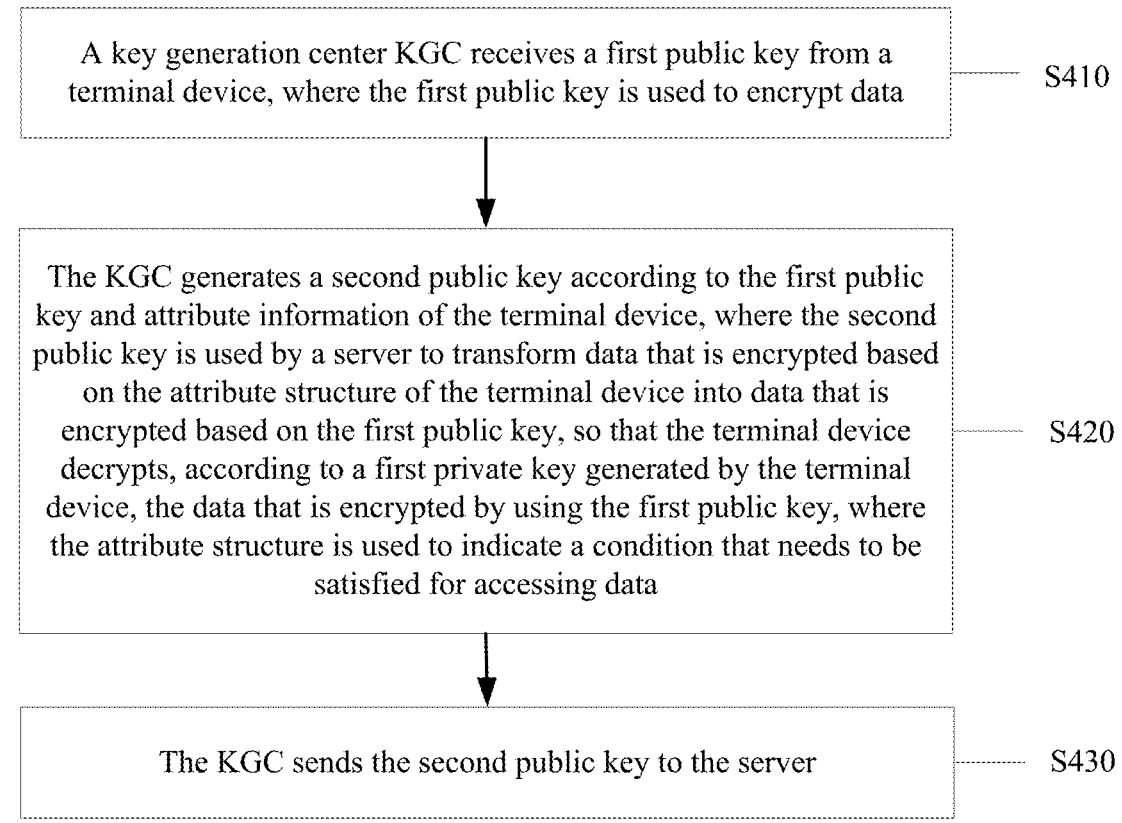
FIG. 4 is a schematic diagram of another data processing method according to an embodiment of the present application.

The following details a data processing method according to an embodiment of the present application with reference to FIG. 3 to FIG. 5.

FIG. 3 shows a schematic flowchart of a data processing method according to an embodiment of the present application. As shown in FIG. 3, the method 300 includes the following steps:

S310. A terminal device generates a first public key and a first private key, where the first public key is used to encrypt data, and the first private key is used to decrypt the data that is encrypted by using the first public key.

S320. The terminal device sends the first public key to a key generation center KGC, where the first public key is used by the KGC or a server to generate a transform key, the transform key is used by the server to transform data that is encrypted based on an attribute structure of the terminal device into the data that is encrypted based on the first public key, and the attribute structure is used to indicate a condition that needs to be satisfied for accessing data.

S330. The terminal device receives second data sent by the server, where the second data is data that is generated after the server processes first data according to the transform key, and the first data is data that is generated through encryption based on the attribute structure of the terminal device and that is obtained by the server.

S340. The terminal device decrypts the second data according to the first private key.

In this embodiment of the present application, the terminal device may be a terminal device in the Internet of Things (IoT), may be a terminal device in a machine-to-machine (M2M) communications system or a terminal device in a Wireless Sensor Network (WSN), or may be another type of terminal device.

The first public key and the first private key that are generated by the terminal device are in a pair, where the first public key is used to encrypt data, and the first private key may be used to decrypt the data that is encrypted by using the first public key. The terminal device sends the first public key to the KGC, so that the KGC or the server generates the transform key according to the first public key. The transform key is a key based on the attribute of the terminal device (the attribute of the terminal device is based on an attribute of a user of the terminal device; for example, when the user is revoked, the attribute of the terminal device changes accordingly), and the first public key is nested within the transform key. Therefore, after the server uses the transform key to process the ciphertext (that is, the first data) that is encrypted based on the attribute structure of the terminal device, what is generated is a partially decrypted ciphertext (that is, the second data) bound with the first public key, and actually, the partially decrypted ciphertext is the ciphertext that is encrypted by using the first public key. The terminal device stores the first private key paired with the first public key. After receiving the partially decrypted ciphertext sent by the server, the terminal device may decrypt the ciphertext according to the first private key and a decryption algorithm, to obtain a plaintext.

Because the first private key is stored in the terminal device all the time, and the first private key does not need to be sent to another device, a secure channel does not need to be used in the data processing method in this embodiment of the present application. In addition, because what is obtained after the server processes the first data is still a ciphertext, another device is unable to obtain the final plaintext even if the server conspires with the another device. Therefore, the data processing method in this embodiment of the present application imposes no requirement on security performance of the server. Moreover, the first private key in this embodiment of the present application may be a constant, and the terminal device only needs to perform one exponentiation operation when performing a decryption operation according to the first private key, to obtain the plaintext. This avoids a bilinear pairing operation for which a large quantity of computing resources are consumed in another technical solution, thereby reducing a requirement for a processing capability of the terminal device, and improving resource utilization of the terminal device.

Optionally, the sending, by the terminal device, the first public key to a KGC includes the following step:

S321. The terminal device sends the first public key and certification information to the KGC, where the certification information is used to indicate that the terminal device stores the first private key.

When sending the first public key to the KGC, the terminal device may further send the certification information to the KGC, where the certification information is used to indicate that the terminal device stores the first private key paired with the first public key. In this case, the KGC may determine, according to the certification information, to generate the transform key. If the KGC receives no certification information, the KGC may consider that the first public key is an unauthorized public key, and terminates subsequent processing on the first public key. This can improve security performance of an ABE system.

Optionally, the generating, by a terminal device, a first public key and a first private key includes the following step:

S311. The terminal device generates the first public key and the first private key according to a system parameter and an identity parameter, where the system parameter is public information generated by the KGC, and the identity parameter is identification information of the terminal device.

The system parameter is the public information generated by the KGC, and any device in the system can obtain the system parameter. For example, the system parameter may be generated after the KGC inputs a security parameter $\lambda$ and runs a system setup algorithm of ABE, that is, (par, msk)←F ABE.Setup($1^\lambda$), where par is the system parameter, msk is a master key, and ABE. Setup is the system setup algorithm of attribute-based encryption.

The terminal device may generate a key pair (that is, the first public key and the first private key) for the terminal device according to the system public parameter par, a user identity id (that is, the identity parameter), and an ElGamal key generation algorithm, that is, (skid, pkid)←ElGamal.KeyGen($1\lambda$), where skid is the first private key, pkid is the first public key, and ElGamal.KeyGen is the ElGamal key generation algorithm.

Optionally, the decrypting, by the terminal device, the second data according to the first private key includes the following step:

S341. The terminal device decrypts the second data according to the system parameter, the identity parameter, and the first private key, where the system parameter is the public information generated by the KGC, and the identity parameter is the identification information of the terminal device.

The terminal device may output a plaintext (that is, target data) according to the system parameter par, the user identity id, the first private key skid, a transformed ciphertext CT' (that is, the second data), and an ElGamal decryption algorithm, that is, m'←ElGamal.Dec($sk_{id}$, CT'), where ElGamal.Dec is the ElGamal decryption algorithm, and m' is the plaintext.

The foregoing embodiment is merely an example for description, and this embodiment of the present application is not limited thereto. Any algorithm that can be used to generate the first public key and the first private key and any algorithm that can be used to decrypt the second data shall fall within the protection scope of the present application.

According to the data processing method in this embodiment of the present application, the terminal device generates the public/private key pair, and sends the public key to the KGC, so as to generate the transform key, where the transform key is used by the server to transform the data that is encrypted based on the attribute of the terminal device into the data that is encrypted based on the public key, and only the terminal device can decrypt, by using the private key stored in the terminal device, the data that is encrypted based on the public key. In this way, a secure channel does not need to be used to transmit the private key, and no requirement is imposed on security performance of the server. In addition, because the private key stored in the terminal device may be a constant, a requirement for a processing capability of the terminal device is reduced, and resource utilization of the terminal device is improved.

The foregoing details, with reference to FIG. 3, the data processing method according to the embodiment of the present application from a perspective of a terminal device. The following details, with reference to FIG. 4, a data processing method according to an embodiment of the present application from a perspective of a KGC.

FIG. 4 shows a schematic flowchart of another data processing method according to an embodiment of the present application. As shown in FIG. 4, the method 400 includes the following steps:

S410. A key generation center KGC receives a first public key from a terminal device, where the first public key is used to encrypt data.

S420. The KGC generates a second public key according to the first public key and attribute information of the terminal device, where the second public key is used by a server to transform data that is encrypted based on the attribute structure of the terminal device into data that is encrypted based on the first public key, so that the terminal device decrypts, according to a first private key generated by the terminal device, the data that is encrypted based on the first public key, where the attribute structure is used to indicate a condition that needs to be satisfied for accessing data.

S430. The KGC sends the second public key to the server.

After receiving the first public key sent by the terminal device, the KGC may generate the second public key based on the first public key and the attribute of the terminal device. The second public key is a public key based on the attribute of the terminal device, and may be used to decrypt data that is encrypted based on the attribute of the terminal device. Because the first public key is nested within the second public key, after the data that is encrypted based on the attribute of the terminal device is processed by using the second public key, generated data is the ciphertext that is encrypted based on the first public key. The terminal device may use the first private key stored in the terminal device, to decrypt the ciphertext that is encrypted based on the first public key. The first private key is a key paired with the first public key, and may be used to decrypt the data that is encrypted based on the first public key. In this embodiment of the present application, the attribute information of the terminal device may be specific identity (id) information of the terminal device, and the KGC may further generate the second public key according to the first public key and an attribute set (that is, a set of a plurality of attributes) of the terminal device.

Because the first private key is stored in the terminal device all the time, and the first private key does not need to be sent to another device, a secure channel does not need to be used in the data processing method in this embodiment of the present application. In addition, because what is obtained after the server processes the first data is still a ciphertext, another device is unable to obtain the final plaintext even if the server conspires with the another device. Therefore, the data processing method in this embodiment of the present application imposes no requirement on security performance of the server. Moreover, the first private key in this embodiment of the present application may be a constant, and the terminal device only needs to perform one exponentiation operation when performing a decryption operation according to the first private key, to obtain the plaintext. This avoids a bilinear pairing operation for which a large quantity of computing resources are consumed in another technical solution, thereby reducing a requirement for a processing capability of the terminal device, and improving resource utilization of the terminal device.

Optionally, after the generating, by the KGC, a second public key, the method further includes the following steps:

S421. The KGC generates a transform key or an error prompt according to the second public key and key update information, where the key update information is used to indicate whether the terminal device is revoked; and when the key update information indicates that the terminal device is revoked, the KGC generates the error prompt according to the second public key and the key update information; or when the key update information indicates that the terminal device is not revoked, the KGC generates the transform key according to the second public key and the key update information, where the transform key is used by the server to transform the data that is encrypted based on the attribute of the terminal device into the data that is encrypted based on the first public key, so that the terminal device decrypts, according to the first private key generated by the terminal device, a result of the transform using the transform key; and the sending, by the KGC, the second public key to the server includes: S422. The KGC sends the transform key to the server; or S423. The KGC sends the second public key and the key update information to the server, so that the server generates the transform key or the error prompt according to the second public key and the key update information.

If the terminal device is currently in a non-revoked state, the KGC may generate the key update information according to a revocation list indicating that the terminal device is not revoked, where the key update information is used to indicate that the terminal device is not revoked; and generates the transform key according to the second public key and the key update information, where the transform key is still a key based on the attribute of the terminal device, and within which the first public key is nested. The KGC sends the transform key to the server, and the server may transform, by using the transform key, the data that is encrypted based on the attribute of the terminal device into the data that is encrypted based on the first public key, so that the terminal device decrypts, according to the first private key generated by the terminal device, a result of the transform using the transform key.

Alternatively, the KGC may send, to the server, the second public key and the key update information indicating that the terminal device is not revoked, so that the server generates the transform key according to the second public key and the key update information.

If the terminal device is currently in a revoked state, the KGC may generate the key update information according to a revocation list indicating that the terminal device is revoked, where the key update information is used to indicate that the terminal device is revoked; and the KGC generates the error prompt according to the key update information and the second public key.

Alternatively, the KGC may send, to the server, the second public key and the key update information indicating that the terminal device is revoked, so that the server generates the error prompt according to the second public key and the key update information.

According to the data processing method in this embodiment of the present application, the key update information that is used to indicate whether the terminal device is revoked is generated by the KGC, and the transform key is generated according to the key update information and the second public key, so that it can be ensured that a terminal device that is not revoked can obtain encrypted data, and a terminal device that is revoked cannot obtain encrypted data. This improves security performance of a system.

Optionally, before the generating, by the KGC, a second public key, the method 400 further includes:

S411. The KGC receives certification information from the terminal device, where the certification information is used to indicate that the terminal device stores the first private key.

S412. The KGC determines, according to the certification information, to generate the second public key.

When sending the first public key to the KGC, the terminal device may further send the certification information to the KGC, where the certification information is used to indicate that the terminal device stores the first private key paired with the first public key. In this case, the KGC may determine, according to the certification information, to generate the second public key. If the KGC receives no certification information, the KGC may consider that the first public key is an unauthorized public key, and terminates subsequent processing on the first public key. This can improve security performance of an ABE system.

Optionally, the generating, by the KGC, a second public key according to the first public key and attribute information of the terminal device includes the following step:

S426. The KGC generates the second public key and updated internal state information according to the first public key, the attribute information of the terminal device, a system parameter, a master key, and internal state information of the KGC, where the system parameter is public information generated by the KGC, and the master key is a private key generated by the KGC.

The KGC may generate the system parameter par and the master key msk during initialization. For example, the terminal device inputs a security parameter $\lambda$ and runs a system setup algorithm of ABE, that is, (par, msk)←ABE.Setup($1^\lambda$), where ABE.Setup is the system setup algorithm of attribute-based encryption. In addition, the algorithm prepares an initially empty revocation list rl and state information st, and outputs (par, msk, rl, st) finally.

If determining to generate the second public key, the KGC may generate the second public key in the following method: inputting the system parameter par, the master key msk, the first public key $pk_{id}$, an attribute set A (that is, a set including multiple pieces of attribute information of the terminal device), and the internal state st of the KGC; running a key generation algorithm of ABE to obtain an intermediate key, that is, $sk_{A,id}$←ABE.KeyGen(msk, A, id, st), where ABE.KeyGen is the key generation algorithm of attribute-based encryption; encrypting the intermediate key by using an ElGamal encryption algorithm; and outputting an attribute-based key (that is, the second public key) of the terminal device, that is, $pk_{id}^A$←ElGamal.Enc($pk_{id}$, $sk_{A,id}$), where ElGamal.Enc is the ElGamal encryption algorithm. The ElGamal encryption algorithm may be used to encrypt entire content of the intermediate key $sk_{A,id}$, to improve security performance; or only encrypt a part of the intermediate key $sk_{A,id}$, to reduce computation load of the KGC.

Optionally, the generating, by the KGC, the transform key according to the second public key and the first key update information includes the following step:

S427: The KGC generates the transform key according to the second public key, the first key update information, the system parameter, and an identity parameter, where the key update information indicates that the terminal device is not revoked.

The KGC may generate the first key update information in the following method: inputting the system parameter par, the master key msk, a time period value t, the revocation list rl, and the internal state st; and running a key update algorithm of ABE for the algorithm to output the first key update information, that is, $tku_t$←ABE.KeyUpdate(msk, rl, t, st), where ABE.KeyUpdate is the key update algorithm of attribute-based encryption, the revocation list rl includes the terminal device, and the internal state st is changed by the key update algorithm.

Further, the KGC may generate the transform key in the following method: inputting the system parameter par, a user identity id (that is, the identity parameter), the second public key $pk_{id}^A$, and the first key update information $tku_t$; and outputting the transform key $tkc_{id,t}$=($pk_{id}^A$, $tku_t$).

The foregoing embodiment is merely an example for description, and this embodiment of the present application is not limited thereto. Any algorithm that can be used to generate the second public key, the first key update information, and the transform key shall fall within the protection scope of the present application.

According to the data processing method in this embodiment of the present application, the KGC receives the first public key sent by the terminal device, and generates, according to the first public key, the second public key that is based on the attribute of the terminal device, so as to transform the data that is encrypted based on the attribute of the terminal device into the data that is encrypted based on the first public key, and only the terminal device can decrypt, by using the first private key stored in the terminal device, the data that is encrypted based on the first public key. In this way, a secure channel does not need to be used to transmit the private key, and no requirement is imposed on security performance of the server. In addition, because the private key stored in the terminal device may be a constant, a requirement for a processing capability of the terminal device is reduced, and resource utilization of the terminal device is improved.

The foregoing details, with reference to FIG. 4, the data processing method according to the embodiment of the present application from a perspective of a KGC. The following details, with reference to FIG. 5, a data processing method according to an embodiment of the present application from a perspective of a server.

FIG. 5 shows a schematic flowchart of still another data processing method according to an embodiment of the present application. As shown in FIG. 5, the method 500 includes the following steps:

S510. A server receives a second public key from a key generation center KGC, where the second public key is used to transform data that is encrypted based on an attribute structure of a terminal device into data that is encrypted based on a first public key generated by the terminal device, so that the terminal device decrypts, according to a first private key generated by the terminal device, the data that is encrypted by using the first public key, where the attribute structure is used to indicate a condition that needs to be satisfied for accessing data.

S520. The server obtains first data, where the first data is data that is encrypted based on the attribute structure of the terminal device.

S530. The server transforms the first data into second data according to the second public key, where the second data is the data that is encrypted based on the first public key.

S540. The server sends the second data to the terminal device, so that the terminal device decrypts the second data according to the first private key.

In this embodiment of the present application, the second public key is a public key generated by the KGC based on the first public key and the attribute information of the terminal device; the second public key is a public key based on the attribute of the terminal device, and may be used to decrypt data that is encrypted based on the attribute of the terminal device. Because the first public key is nested within the second public key, after the data (that is, the first data) that is encrypted based on the attribute of the terminal device is processed by using the second public key, generated data is the ciphertext (that is, the second data) that is encrypted based on the first public key. The terminal device may use the first private key stored in the terminal device, to decrypt the second data. The first private key is a key that is paired with the first public key and that is generated by the terminal device, and may be used to decrypt the data that is encrypted based on the first public key.

In this embodiment of the present application, the second public key may be a public key generated by the KGC based on the first public key and the attribute information of the terminal device, or may be a public key (which may be referred to as a "transform key") generated by the KGC based on the first public key, the attribute information of the terminal device, and key update information, where the key update information is used to indicate that the terminal device is not revoked.

Because the first private key is stored in the terminal device all the time, and the first private key does not need to be sent to another device, a secure channel does not need to be used in the data processing method in this embodiment of the present application. In addition, because what is obtained after the server processes the first data is still a ciphertext, another device is unable to obtain the final plaintext even if the server conspires with the another device. Therefore, the data processing method in this embodiment of the present application imposes no requirement on security performance of the server. Moreover, the first private key in this embodiment of the present application may be a constant, and the terminal device only needs to perform one exponentiation operation when performing a decryption operation according to the first private key, to obtain the plaintext. This avoids a bilinear pairing operation for which a large quantity of computing resources are consumed in another technical solution, thereby reducing a requirement for a processing capability of the terminal device, and improving resource utilization of the terminal device.

Optionally, after the receiving, by a server, a second public key, the method 500 further includes:

S511. The server receives key update information from the KGC, where the key update information is used to indicate whether the terminal device is revoked.

S512. The server generates a transform key or an error prompt according to the second public key and the key update information; and when the key update information indicates that the terminal device is revoked, the server generates the error prompt according to the second public key and the key update information; or when the key update information indicates that the terminal device is not revoked, the server generates the transform key according to the second public key and the key update information, where the transform key is used by the server to transform the data that is encrypted based on the attribute structure of the terminal device into the data that is encrypted based on the first public key, so that the terminal device decrypts, according to the first private key generated by the terminal device, the data that is encrypted by using the first public key.

The transforming, by the server, the first data into second data according to the second public key includes the following step:

S531. The server transforms the first data into the second data according to the transform key.

If the terminal device is currently in a non-revoked state, the KGC may generate the key update information according to a revocation list indicating that the terminal device is not revoked, where the key update information is used to indicate that the terminal is revoked; and the server may generate the transform key according to the second public key and the key update information, where the transform key is still a key based on the attribute of the terminal device, and within which the first public key is nested. The server may transform, by using the transform key, the data that is encrypted based on the attribute of the terminal device into the data that is encrypted based on the first public key, so that the terminal device decrypts, according to the first private key generated by the terminal device, a result of the transform using the transform key.

If the terminal device is currently in a revoked state, the KGC may generate the key update information according to a revocation list indicating that the terminal device is revoked, where the key update information is used to indicate that the terminal device is revoked; and the server may generate the error prompt according to the key update information and the second public key.

According to the data processing method in this embodiment of the present application, the key update information that is used to indicate that the terminal device is not revoked and that is generated by the KGC is received, and the transform key is generated according to the key update information and the second public key, so that it can be ensured that a terminal device that is not revoked can obtain encrypted data, and a terminal device that is revoked cannot obtain encrypted data. This improves security performance of a system.

Optionally, the generating, by the server, the transform key according to the second public key and the key update information includes the following step:

S515. The server generates the transform key according to the second public key, the key update information, a system parameter, and an identity parameter, where the system parameter is public information generated by the KGC, and the identity parameter is identification information of the terminal device.

The system parameter is the public information generated by the KGC, and any device in the system can obtain the system parameter. For example, the system parameter may be generated after the KGC inputs a security parameter $\lambda$ and runs a system setup algorithm of ABE, that is, (par, msk)$\leftarrow$ABE.Setup($1^\lambda$), where par is the system parameter, msk is a master key, and ABE.Setup is the system setup algorithm of attribute-based encryption.

The server may generate the transform key in the following method: inputting the system parameter par, a user identity id (that is, the identity parameter), the second key $pk_{id}^A$, and the first key update information $tku_t$; and outputting the transform key $tk_{id,t}=(pk_{id}^A, tku_t)$.

Optionally, the transforming, by the server, the first data into second data according to the transform key includes the following step:

S532. The server transforms the first data into the second data according to the transform key, the system parameter, the attribute information of the terminal device, the identity parameter, and a time parameter, where the system parameter is the public information generated by the KGC, the identity parameter is the identification information of the terminal device, and the time parameter is used to indicate that the terminal device is allowed to use the transform key at a current time point.

The server may transform the first data into the second data in the following method: inputting the system parameter par, the user identity id (that is, the identity parameter), an attribute set A, the transform key $tk_{id,t}$, and a ciphertext (that is, the first data); running a decryption algorithm of ABE for the algorithm to output a transformed ciphertext, that is, CT'←ABE.Dec($pk_{id}^A$, $tku_t$, CT), where ABE.Dec is the decryption algorithm of attribute-based encryption, and $pk_{id}^A$ is the transform key.

The foregoing embodiment is merely an example for description, and this embodiment of the present application is not limited thereto. Any algorithm that can be used to generate the transform key and any algorithm that can be used to transform the first data into the second data according to the transform key shall fall within the protection scope of the present application.

According to the data processing method in this embodiment of the present application, the server receives the second public key from the KGC, where the second public key may be a public key (that is, the transform key) generated by the KGC based on the first key update information, and the first key update information is used to indicate that the terminal device is not revoked; or the second public key may be a public key generated by the KGC not based on the first key update information. The server may transform, according to the second public key, the data that is encrypted based on the attribute of the terminal device into the data that is encrypted based on the first public key, and only the terminal device can decrypt, by using the first private key stored in the terminal device, the data that is encrypted based on the first public key. In this way, a secure channel does not need to be used to transmit the private key, and no requirement is imposed on security performance of the server. In addition, because the private key stored in the terminal device may be a constant, a requirement for a processing capability of the terminal device is reduced, and resource utilization of the terminal device is improved.

The following provides two specific implementations of the data processing method according to the embodiments of the present application.

Embodiment 1

Let G be a group whose order is a prime number p. To ensure adequate difficulty in a discrete logarithm, it is suggested that p should not be less than 512 bits. ê:G×G→$G_1$ denotes bilinear pairing, and g is a generator of G. Server-aided revocable ABE provided in the present application includes the following algorithms:

Setup. This algorithm takes a security parameter $1^\lambda$ as input, and randomly selects a group G whose order is a prime number p and a generator g, where g∈G. In addition, the algorithm randomly selects u, h, $u_0$, $h_0$, w, and v that belong to G, and α that belongs to $Z_p$. Let rl be an initially empty table so as to store a revoked user, and BT be a binary tree having at least N leaf nodes. Two functions $F_1$ and $F_2$ that map any value y to an element in G are defined as follows: $F_1(y)=u^y h$ and $F_2(y)=u_0^y h_0$, where y∈$Z_p$. Finally, a system master private key msk=α, a system public parameter par=(p, g, u, h, $u_0$, $v_0$, w, v, $ê(g,g)^\alpha$), a table rl, and state information st=BT are output.

UserKG This algorithm takes a system parameter par and an identity id as input, randomly selects β, where β∈$Z_p$, and outputs a user private/public key pair ($sk_{id}$, $pk_{id}$)=(β,$g^\beta$) for the user id.

PubKG This algorithm takes a system public parameter par, a master private key msk, an identity id, a user public key $pk_{id}$, a user attribute set A, and state information st as input. Let $A_1$, . . . , and $A_k$ be attributes of the attribute set A. The algorithm first selects a non-defined node θ from a binary tree BT, and stores the identity information id in the node. Then, the following steps are performed for each node x, where x∈Path(θ).

Fetch $g_x$ from the node x. If this value has not been defined for x, select $g_x$ randomly and store $g_x$ in the node x, where $g_x$∈G. Then, compute $g_x'=pk_{id}^\alpha/g_x$.

Select $r_x$, $r_{x,1}$, . . . , and $r_{x,z}$ randomly, where $r_x$, $r_{x,1}$, . . . , $r_{x,k}$∈$Z_p$, and compute $P_{x,1}=g_x' \cdot w^{r_x}$, $P_{x,2}=g^{r_x}$, $P_{x,3}^{(i)}=g^{r_{x,i}}$, and $P_{x,4}^{(i)}=F_1(A_i)^{r_{x,i}} \cdot v^{-r_x}$.

Finally, this algorithm outputs a user attribute-based public key $pk_{id}^A=\{x, P_{x,1}, P_{x,2}, \{P_{x,3}^{(i)}, P_{x,4}^{(i)}\}_{i\in[1,k]}\}_{x\in Path(\theta)}$ and updated st.

TKeyUp. This algorithm takes a system public parameter par, a master private key msk, a time period value t, a revocation list rl, and state information st as input, fetches a corresponding $g_x$ for each node x, where x∈KUNodes(BT, rl, t), and then, selects $s_x$ randomly, where $s_x$∈$Z_p$, and outputs transform key update information $tku_t=\{x, Q_{x,1}, Q_{x,2}\}_{x\in KUNodes(BT,rl,t)}$, where $Q_{x,1}=g_x \cdot F_2(t)^{s_x}$ and $Q_{x,2}=g^{s_x}$.

TranKG This algorithm takes a system public parameter par, an identity id, a user attribute-based public key $pk_{id}^A$, and transform key update information $tku_t$ as input. Let Path(θ) be I, and KUNodes(BT, rl, t) be J. The algorithm first parses $pk_{id}^A$ into $\{x, P_{x,1}, \{P_{x,3}^{(i)}, P_{x,4}^{(i)}\}_{i\in[1,k]}\}_{x\in I}$, and parses $tku_t$ into $\{x, Q_{x,1}, Q_{x,2}\}_{x\in J}$. If I∩J=Φ, that is, an intersection set of I and J is empty, the algorithm returns ⊥ indicating that the user is revoked, and an error occurs in transform key generation, that is, an "error prompt"). Otherwise, the algorithm randomly selects $r_x'$, $r_{x,1}'$, . . . , $r_{x,k}'$, and $s_x'$ that belong to $Z_p$ for each node x, where x∈I∩J, and outputs a transform key $tk_{id,t}=(tk_1, tk_2, \{tk_3^{(i)}, tk_4^{(i)}\}_{i\in[1,k]}, tk_5)$ for the user id, where $$tk_1=P_{x,1} \cdot Q_{x,1} \cdot w^{r_x'} \cdot F_2(t)^{s_x'}=pk_{id}^\alpha \cdot w^{r_x+r_x'} \cdot F_2(t)^{s_x+s_x'},$$

$$tk_2=P_{x,2} \cdot g^{r_x'}=g^{r_x+r_x'}, \; tk_3^{(i)}=P_{x,3}^{(i)} \cdot g^{r_{x,i}'}=g^{r_{x,i}+r_{x,i}'},$$

$$tk_4^{(i)}=P_{x,4}^{(i)} \cdot F_1(A_i)^{r_{x,i}'} \cdot v^{-r_x'}=F_1(A_i)^{r_{x,i}+r_{x,i}'} \cdot v^{-(r_x+r_x')}, \text{ and}$$

$$tk_5=Q_{x,2} \cdot g^{s_x'}=g^{s_x+s_x'}.$$

Encrypt. This algorithm takes a system public parameter par, a linear secret sharing access control structure (M, ρ), a time period value t, and a message m as input, and randomly selects a vector $\vec{v}=(\mu, y_2, \ldots, y_n)^\perp \in Z_p^n$. μ is a secret index used to encrypt a message. For each i ranging from 1 to l, the algorithm computes $v_i=M_i \cdot \vec{v}$, where $M_i$ is an $i^{th}$ row of M In addition, the algorithm randomly selects $\mu_1, \ldots,$ and $\mu_l$ that belong to $Z_p$, and then outputs a ciphertext CT=((M, ρ), t, $C_0, C_1, \{C_2^{(i)}, C_3^{(i)}, C_4^{(i)}\}_{i\in[1,l]}, C_5$), where $$C_0=ê(g,g)^{\alpha\mu} \cdot m, \; C_1=g^\mu, \; C_2^{(i)}=w^{v_i} v^{\mu_i},$$

$$C_3^{(i)}=F_1(A_i)^{-\mu_i}, \; C_4^{(i)}=g^{\mu_i}, \text{ and } C_5=F_2(t)^\mu.$$

Transform. This algorithm takes a system public parameter par, an identity id, a corresponding user transform key $tk_{id,t}$, a user attribute set A, a time period value t, and a ciphertext CT of an access control structure (M, ρ) as input. It is assumed that A satisfies the access control structure (M, ρ), and Let I be I={i: ρ(i)∈A}, and $\{w_i \in Z_p\}_{i \in I}$ be a series of constant values that makes $$\sum_{i \in I} w_i v_i = \mu$$

true provided that $\{v_i\}$ is a valid secret share that is obtained for a secret $\mu$ according to $(M, \rho)$. The algorithm parses the ciphertext CT into $((M, \rho), t, C_0, C_1, \{C_2^{(i)}, C_3^{(i)}, C_4^{(i)}\}_{,i\in[1,l]}, C_5)$. If the attribute set A and transform key $tk_{id,t}$ do not satisfy the access structure $(M, \rho)$ provided in the CT, a special notation $\perp$ is output to indicate that the transform fails. Otherwise, a transformed ciphertext $CT'=(C_0', C_0)$ (that is, a partially decrypted ciphertext) is output using the following formula:

$$C_0' = \frac{\prod_{i\in I}(\hat{e}(C_2^{(i)}, tk_2)\hat{e}(C_3^{(i)}, tk_3^{(i)})\hat{e}(C_4^{(i)}, tk_4^{(i)}))^{w_i}\hat{e}(C_5, tk_5)}{\hat{e}(C_1, tk_1)} = \frac{1}{\hat{e}(g, pk_{id}^\alpha)^\mu}.$$

Decrypt. This algorithm takes a system public parameter par, an identity id, a corresponding user private key $sk_{id}$, and a transformed ciphertext $CT'=(C_0', C_0)$ as input. If $C_0'$ or $C_0$ does not belong to a group $G_1$, the output operation fails. Otherwise, a plaintext message is computed and output using the following formula:

$$m = (C_0')^{1/\beta} \cdot C_0 = \frac{1}{\hat{e}(g, g^\alpha)^\mu} \cdot \hat{e}(g, g)^{\alpha\mu} \cdot m.$$

Revoke. This algorithm takes an identity value id, a time period value t, a revocation list rl, and state information st as input. For each node x related to the identity id, the algorithm adds $(x, t)$ to rl, and then outputs an updated revocation list rl.

Security of SR-ABE may be defined by defining a security model of indistinguishability under chosen plaintext attack (IND-CPA). By defining an attack algorithm and a challenge algorithm, a potential security threat in reality and a capability of an attacker in standard ABE security are considered in terms of form. An attacker can obtain a private key and a user attribute-based public key of a data user selected by the attacker. In this case, with regard to a challenged access control structure, the attacker should not obtain any partial information related to encryption information. In addition, the security model allows the attacker to access periodical key update information and transform key information in different time periods, and revoke a user according to the attacker's own need. In this case, for any revoked user that is corresponding to an attribute satisfying the challenged access control structure, if the user is already revoked at the time of encryption, the attacker should not obtain any partial information related to encryption information.

Under deterministic (q−1) assumption, the server-aided revocable ABE scheme provided in this embodiment of the present application can be proved secure in the standard model under the definition of selective IND-CPA security.

Embodiment 2

Notations used in this embodiment of the present application are first described.

$T_t$: Time period management is performed by using a binary tree. It is assumed that Q is a binary tree whose leaf nodes store all timestamps (with an upper limit q). For example, when q=8, the tree Q is shown in FIG. 6. A root node is named r-"*", where $r=\log_2 q=3$. For each subnode on the left, a first * is replaced with 0; for each subnode on the right, a first * is replaced with 1. All nodes of the tree may be named as such.

For each ciphertext, $T_t$ only includes a combination of nodes corresponding to a time period t and all time periods that are greater than t. For example, if a current time period is 3 (011 in binary), $T_t$ is $\{011, 1\}$ and includes leaf nodes 3 to 7. If a current time period is 5 (101 in binary), $T_t$ is $\{101, 11\}$ and includes leaf nodes 5 to 7. It can be easily learnt that a maximum size of $T_t$ is equal to a height (equal to log 2q) of the tree. Therefore, a key of a user in a time period 4 (100 in binary) can be used to decrypt the foregoing first ciphertext (timestamps 3 to 7), but cannot be used to decrypt the foregoing second ciphertext (timestamps 5 to 7).

Path(ID): Revocation management is performed by using a tree U, and a leaf node is marked using an identity ID. For a leaf node group V, a function U(V) returns a deterministic and selective set of nodes of U, so that some ancestors of a leaf node v are included in U(V) only when v belongs to V. Such a function is present and may be computed within a polynomial time (a size of V and a size of ID). A character string ID indicating a set of nodes from a root of U to a leaf $v_{ID}$ (including the root and the leaf) is defined as Path(ID).

Figure 7:
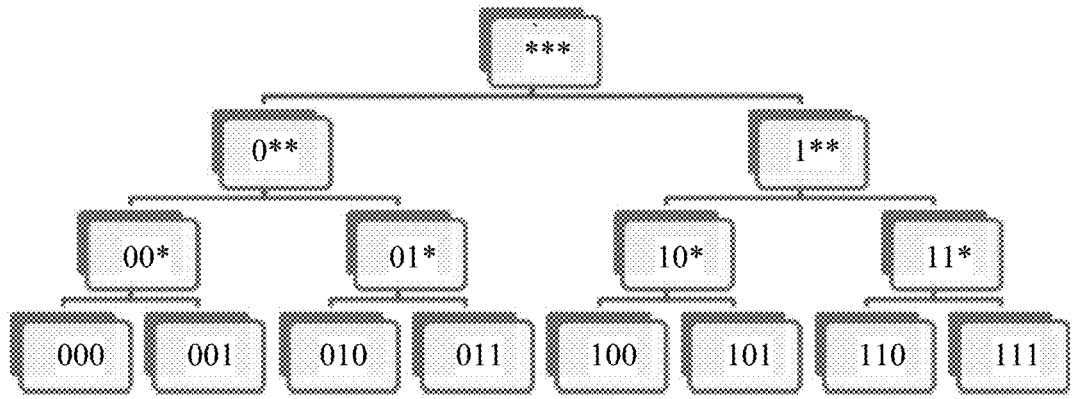
FIG. 7 is a schematic diagram of another binary tree to which an embodiment of the present application is applicable.

As shown in FIG. 7, the tree U shown in FIG. 7 represents all users. Assuming that V={000, 011} is a group of users that have been revoked, U(V) is {000, 00*, 0, *, 011, 01*} (including ancestors of 000 and 011). In addition, Path(011) is {011, 01*, 0, *} (including a path from the root to 011).

$\omega_{i,b}$: An attribute related to a time period is described by using $\omega_{i,b}$. Herein an index i is used to indicate a level of the tree. A root is at level 0, and a subnode of the root is at level 1, and so on. A maximum level is $r=\log_2 q$. An index b is 0 or 1 and indicates a value of level i. For example, for a time period corresponding to 101, related attributes of the group are $\{\omega_{1,1}, \omega_{2,0}, \omega_{3,1}\}$.

$(B_y, \beta_y)$: This is an access control policy for a time period y. It is assumed that B is a matrix with 2r rows and (r+1) columns, and is obtained by cascading 2×2 all-1 matrices along a diagonal line, where values of other elements of the matrix are 0. The following provides an example when r=3:

$$B = \begin{pmatrix} 1 & 1 & 0 & 0 \\ 1 & 1 & 0 & 0 \\ 0 & 1 & 1 & 0 \\ 0 & 1 & 1 & 0 \\ 0 & 0 & 1 & 1 \\ 0 & 0 & 1 & 1 \end{pmatrix}$$

Rows of the matrix B are denoted by $b_{1,0}, b_{1,1}, b_{2,0}, b_{2,1}, \ldots, b_{r,0}$, and $b_{r,1}$, and are sorted in descending order. For all the rows of the matrix B, a label $\beta$ is defined as $\beta(b_{i,d})=\omega_{i,d}$. An access control policy $(B_y, \beta_y)$ is defined for a time period y. For each index i that belongs to $[1, \ldots r]$, if a corresponding value of y at level i (denoted by y[i]) is not *, a row $b_{i,y[i]}$ is removed from the matrix B, to obtain a matrix $B_y$. For example, when r=3 and y=01*, a matrix $B_y$ and a label $\beta_y$ (indicated by the following arrows) are as follows:

$$B_y = \begin{pmatrix} 1 & 1 & 0 & 0 \\ 0 & 1 & 1 & 0 \\ 0 & 0 & 1 & 1 \\ 0 & 0 & 1 & 1 \end{pmatrix}, \beta_y = \begin{matrix} b_{1,0} \to \omega_{1,0} \\ b_{2,1} \to \omega_{2,1} \\ b_{3,0} \to \omega_{3,0} \\ b_{3,1} \to \omega_{3,1} \end{matrix}$$

Note that an attribute group S satisfies $(B_y, \beta_y)$ only when: (1) $\omega_{i,y[i]}$ is included in S if y[i] is made not equal to * for all is; (2) $\omega_{i,0}$ or $\omega_{i,1}$ is included in S if y[i] is made equal to * for all is.

$(M, \rho) \vee (B_y, \beta_y)$: The notation $(M, \rho) \vee (B_y, \beta_y)$ is used to represent a combination of two LSSS policies $(M, \rho)$ and $(B_y, \beta_y)$, that is, an LSSS policy generated by sequentially adding rows of $B_y$ to a matrix M (and padding the rows to a same length).

A specific implementation of Embodiment 2 is as follows:

Setup($1^\lambda$): A security parameter $\lambda$ is input, and a bilinear group G whose order is $N=p_1p_2p_3$ (the order is equal to a product of three random prime numbers, and reaches the security strength $\lambda$) is selected; $\alpha$ and g are randomly selected, where $\alpha \in Z_N$ and $g \in G_{p_1}$, and an initially empty revocation list rl and a state st are prepared; for each i, $s_i$ and $X_3$ are randomly selected, where $s_i \in Z_N$, $X_3 \in G_{p_3}$; it is specified that msk=$(\alpha, X_3)$, par=$(N, g, g^\alpha, e(g,g)^\alpha$, and $\{T_i=g^{s_i}$ for all i$\}$); and (par, msk, rl, st) is output.

UserKG(par, id): A system public parameter par and a user identity id are input; $\beta$ is randomly selected, where $\beta \in Z_N$; and $sk_{id}=\beta$ and $pk_{id}=g^\beta$ are output.

PubKG(par, msk, id, $pk_{id}$, A, st): A system public parameter par, a master key msk, a user public key $pk_{id}$, an attribute set A, and an internal state st of a KGC are input; and for each x∈Path(id), the following computation is performed:

Search the internal state st for $(x, \alpha_x)$. If there is no $(x, \alpha_x)$, select $\alpha_x$ randomly, where $\alpha_x \in Z_N$, and store $(x, \alpha_x)$ in st.

Select $t_x$, V, Z, and $\{W_i\}_{i \in S}$ randomly, where $t_x \in Z_N$ and V, Z, $\{W_i\}_{i \in S} \in G_{p_3}$; compute $K_x = g^{t_x}V$, $K_{A,x} = \{K_{x,i} = T_i^{t_x}W_i : i \in A\}$, and $K^*_x = g^{\beta \alpha_x} g^{\alpha t_x} Z$; and output $pk_{id}^A = \{K_x, K_{A,x}, K^*_x$: for all $x \in Path(id)\}$.

TKeyUp(par, msk, t, rl, st): A system public parameter par, a master key msk, a time period t, a revocation list rl, and an internal state st are input; and for each x∈U(rl) (a tree of the revocation list), the following computation is performed:

Denote a set $S=\{\omega_{i,t[i]} : i \in [r]\}$ as time-related attributes.

Search the internal state st for $(x, \alpha_x)$. If there is no $(x, \alpha_x)$, select $\alpha_x$ randomly, where $\alpha_x \in Z_N$, and store $(x, \alpha_x)$ in st.

Select $t_x$, V, Z, and $\{W_i\}_{i \in S}$ randomly, where $t_x \in Z_N$ and V,Z,$\{W_i\}_{i \in S} \in G_{p_3}$; compute $K_x = g^{t_x}V$, $K_{A,x} = \{K_{x,i} = T_i^{t_x}W_i : i \in A\}$, and $K^*_x = g^{\alpha - \alpha_x} g^{\alpha t_x} Z$; and output $tku_t = (\{K_x, K_{A,x}, K^*_x$: for all $x \in U(rl)\}, t, rl)$.

TranKG(par, id, $pk_{id}^A$, $tku_t$): A system public parameter par, a user identity id, an attribute-based public key $pk_{id}^A$, and key update information $tku_t$ are input. If the user identity id is not in rl of $tku_t$, there is definitely a node x that belongs to both U(rl) and Path(id). Key update information corresponding to x is:

$SK_0 = \{K_x, K_{A,x}, K^*_x\} \in pk_{id}^A$, and $SK_1 = \{K_x, K_{A,x}, K^*_x\} \in tku_t$; and $tk_{id,t} = (SK_0, SK_1)$ is output.

Encrypt(par, $(M, \rho)$, t, m): A system public parameter par, an access control policy $(M, \rho)$, a time period t, and a plaintext m are input; and an LSSS control policy $(\hat{M}, \hat{\rho}) = (M, \rho) \vee (B_y, \beta_y)$ is set for each y, where $y \in T_t$. v and $r_i$ ($i \in [n]$) are randomly selected, where $v=(s, v_2, \ldots, v_n) \in Z_N^n$ and $r_i \in Z_N$; the following computation is performed:

$C_y = m \cdot e(g,g)^{\alpha S}$, $C_y' = g^S$, $\{C_{y,i} = g^{a\hat{M}_i v} T_{\hat{\rho}(i)}^{-r_i}, D_{y,i} = g^{r_i}\}_{i \in [n]}$; and a ciphertext $CT_t = (\{C_y, C_y', \{C_{y,i}, D_{y,i}\}_{i \in [n]}:$ for all $y \in T_t\}$, $(M, \rho))$ is output.

Transform(par, id, A, $tk_{id,t'}$, $CT_t$): A system public parameter par, a user identity id, an attribute set A, a transform key $tk_{id,t'}$, and a ciphertext are input. If t' is equal to or greater than t, there is y who is an ancestor of t', where $y \in T_t$. $(C_y, C_y', \{C_{y,i}, D_{y,i}\}_{i \in [n]})$ is extracted from the ciphertext $CT_t$ for y. $tk_{id,t'}$ is indicated as $(SK_0, SK_1)$, where $SK_0 = \{K_{x,0}, \{K_{x,i,0} : i \in A\}, K^*_{x,0}\}$ and $SK_1 = \{K_{x,1}, \{K_{x,i,1} : i \in A\}, K^*_{x,1}\}$.

First, $\omega_i$ that makes $\Sigma_{\rho(i) \in A} \omega_i \hat{M}_i = 1$ is computed, where $\omega_i \in Z_N$. Then, the following computation is performed:

$$\prod_{\rho(i) \in A} (e(C_{y,i}, K_{x,0}) \cdot e(D_{y,i}, K_{x,\rho(i),0}))^{\omega_i} = e(g,g)^{sat_x}, \text{ and}$$

$$e(K^*_{x,0}, C_y') = e(g^{\beta \alpha_x}, g^S) \cdot e(g^{\alpha t_x}, g^S).$$

$CT_0' = e(g^{\beta \alpha_x}, g^S)$ can be computed by using the foregoing two values. Similarly, $CT_1' = e(g^{\alpha - \alpha_x}, g^s)$ can be computed according to the following formulas by using SK1:

$$\prod_{\rho(i) \in A} (e(C_{y,i}, K_{x,1}) \cdot e(D_{y,i}, K_{x,\rho(i),1}))^{\omega_i} = e(g,g)^{sat_x'}, \text{ and}$$

$$e(K^*_{x,1}, C_y') = e(g^{\alpha - \alpha_x}, g^S) \cdot e(g^{\alpha t_x'}, g^S); \text{ and}$$

$CT' = (C_y, CT_0', CT_1')$ is finally output.

Decrypt(par, id, $sk_{id}$, CT'): A system public parameter par, a user identity id, a user private key $sk_{id}=\beta$, and a transform ciphertext $CT' = (C_y, CT_0', CT_1')$ are input; and a plaintext $$m = \frac{C_y}{CT_1'(CT_0')^{\frac{1}{\beta}}}$$

is output.

Revoke(id, t, rl): A revocation user identity id, a time period t, a revocation list rl, and state information st are output; and rl in which $\{(id, t)\}$ is added is used as an updated revocation list rl for output.

The following extensions may be implemented in this embodiment of the present application.

Extension 1: This is a scheme of indistinguishablility under chosen ciphertext attack (IND-CCA security). The foregoing SR-ABE scheme provided in the present application only provides IND-CPA security that is relatively poor. Several existing universal methods may be used to transform an encryption scheme with IND-CPA security into an encryption scheme with IND-CCA security.

For example, the Fujisaki-Okamoto method proposed in 1999 can be used to upgrade an attribute-based or identity-based encryption scheme with IND-CPA security to an encryption scheme with IND-CCA security. A symmetric-key encryption and decryption scheme (E, D) in which IND-CCA is secure and two hash functions are used in the encryption method to perform the following operations: (1) When a message m is encrypted, first select a random number r, and then encrypt r, used as a message, through ABE by using a random number G(r), to generate C1=ABE.Enc(r; G(r)). (2) Encrypt the message m by using a symmetric-key H(r), to generate C2=E(H(r), m). (3) Finally output a ciphertext (C1, C2). Operations for decrypting the ciphertext (C1, C2) are as follows: (1) Decrypt C1 through ABE, to obtain r. (2) Compute ABE.Enc(r; G(r)) and determine whether the value is equal to C1; and if the value is not equal to C1, an error is returned. (3) If step (2) succeeds, decrypt C2 by using the symmetric-key H(r), to obtain the message m.

For another example, the Yamada-Attrapadung-Hanaoka-Kunihiro method proposed in 2011 can be used to upgrade an attribute-based encryption scheme with IND-CPA security to an encryption scheme with IND-CCA security. A one-time signature scheme (S, V) is used. Encryption operations of this method are as follows: (1) When a message m is encrypted, first randomly generate a public/private key pair (vk, sk) as a one-time signature scheme. (2) Add vk to an original access control policy Y to obtain a new access control policy Y' (for example, Y'=Y or vk). (3) Compute a ciphertext (C1, C2, vk), where C1 is an output obtained after the message m is encrypted by ABE by using the access control policy Y', and C2 is an output obtained after the one-time signature is applied to C1 by using sk. Decryption operations are as follows: (1) Use vk and C1 to verify C2 to which the one-time signature is applied; and if the verification fails, an error is returned. (2) If C2 to which the one-time signature is applied is verified successfully, use ABE to decrypt C1, to obtain the message m.

Extension 2: This is for encryption of long data. To improve efficiency of long data encryption, a symmetric key k instead of a message m may be used in the Encrypt algorithm in the attribute-based encryption scheme proposed in this patent, and long data is encrypted in a symmetric encryption manner by using k. In this way, after a user receives a result of partial decryption by a server, the symmetric key K can be retrieved by using a long-term private key of the user, and the long data is finally decrypted by a symmetric encryption algorithm by using k.

Extension 3: This is a server-aided revocable key policy attribute-based encryption (SR-KP-ABE) scheme. On the basis of indirect revocation KP-ABE proposed in a literature [1] (N. Attrapadung and H. Imai. Attribute-based encryption supporting direct/indirect revocation modes. In *Cryptography and Coding, 12th IMA International Conference, Cryptography and Coding* 2009, Cirencester, UK, Dec. 15-17, 2009. Proceedings, volume 5921 of *Lecture Notes in Computer Science*, pages 278-300. Springer, 2009.), the technology used in the foregoing embodiment may be used to obtain the server-aided revocable KP-ABE scheme. A brief description is as follows:

A Setup algorithm is the same as that in the literature [1], but a parameter ax does not need to be set.

The foregoing UserKG algorithm is directly added to the scheme in the literature [1].

A KeyGen algorithm in the literature [1] is changed into a PubKG algorithm by specifying $D_x^{(3)} = pk_{id}^{f(x)} \cdot P(x)^{r_x}$.

A KeyUpdate algorithm, an Encrypt algorithm, and a Revoke algorithm are the same as those in the literature [1].

A Decrypt algorithm having a decryption result $\hat{e}(g,g)^{s\alpha\beta}$ in the literature [1] is used as a needed Transform algorithm.

Finally, the Decrypt algorithm in the literature [1] is replaced with the Decrypt algorithm in the foregoing SR-ABE scheme.

Extension 4: This is server-aided revocable identity-based encryption (SR-IBE). The SR-IBE scheme is proposed in a literature [2] (B. Qin, R. H. Deng, Y. Li, and S. Liu. Server-aided revocable identity-based encryption. In *Computer Security-ESORICS 2015—20th European Symposium on Research in Computer Security, Vienna, Austria, Sep. 21-25, 2015 Proceedings, Part I*, volume 9326 of *Lecture Notes in Computer Science*, pages 286-304. Springer, 2015), to reduce additional user workloads resulting from revocation. However, efficiency of the scheme is still not so desirable. On one hand, a secure channel is required to transmit private keys for all users within a system, while establishing a secure channel is not easy. On the other hand, an amount of computation for user decryption can be further reduced. Specifically, the SR-IBE proposed in the literature [2] may be improved as follows:

It is specified that $g_1 = g^\alpha$ and a master private key is $\alpha$.

The UserKG algorithm in the foregoing SR-ABE is replaced with a PrivKG algorithm in the literature [2].

$g_{x,1} = h^\alpha / g_{x,2}$ in the literature [2] is redefined as $g_{x,1} = pk_{id}^\alpha / g_{x,2}$.

Using the methods described in the extension 1 and the extension 2, the data processing method provided in this embodiment of the present application may be extended to IND-CCA2 security, may support long-message encryption by using a symmetric cryptographic technique, or may both have IND-CCA2 security and support long-message encryption.

In addition, the method described in the extension 3 may be extended to IND-CCA2 security, may support long-message encryption by using a symmetric cryptographic technique, or may both have IND-CCA2 security and support long-message encryption. The method described in the extension 4 may be extended to IND-CCA2 security, may support long-message encryption by using a symmetric cryptographic technique, or may both have IND-CCA2 security and support long-message encryption.

In addition, the scheme in this embodiment of the present application is constructed by using ElGamal encryption in combination with any revocable attribute-based encryption that satisfies one of the following characteristics: The PubKG algorithm includes encrypting all or some of attribute-based keys by using ElGamal; the Transform algorithm runs the ABE.Dec algorithm to perform decryption; and the Decrypt algorithm runs the ElGamal.Dec algorithm to perform decryption. Revocable attribute-based encryption used in the foregoing general construction needs to satisfy the following characteristic:

ElGamal.Dec(skid, ABE.Dec($pk_{id}^A$, $tku_t$, CT)) equals ABE.Dec(ElGamal.Dec(skid, $pk_{id}^A$), tkut, CT). This means that a sequence of ElGamal decryption and revocable attribute-based decryption may be reversed.

The foregoing embodiment mainly describes the solutions in the embodiments of the present application from a perspective of interaction between apparatuses. It can be understood that, to implement the foregoing functions, apparatuses, for example, a terminal device, a key generation center, and a server, include corresponding hardware structures and/or software modules for implementing the functions. A person skilled in the art may be aware that, the units and algorithm steps in the examples described with reference to the embodiments disclosed in this specification may be implemented in the present application by hardware or a combination of hardware and computer software. Whether a function is implemented by hardware or computer software driving hardware depends on particular applications and design constraint conditions of the technical solutions. A person skilled in the art may use a different method for each particular application to implement the described functions, but it should not be considered that the implementation goes beyond the scope of the present application.

In the embodiments of the present application, the terminal device, the key generation center, and the server may be divided into functional units according to the foregoing method examples, for example, divided into functional units in correspondence to functions, or integrating at least two functions into one processing unit. The integrated unit may be implemented in a form of hardware, or may be implemented in a form of a software functional unit. It should be noted that the unit division in the embodiments of the present application is an example, and is merely logical function division and may be other division in actual implementation.

Figure 8A:
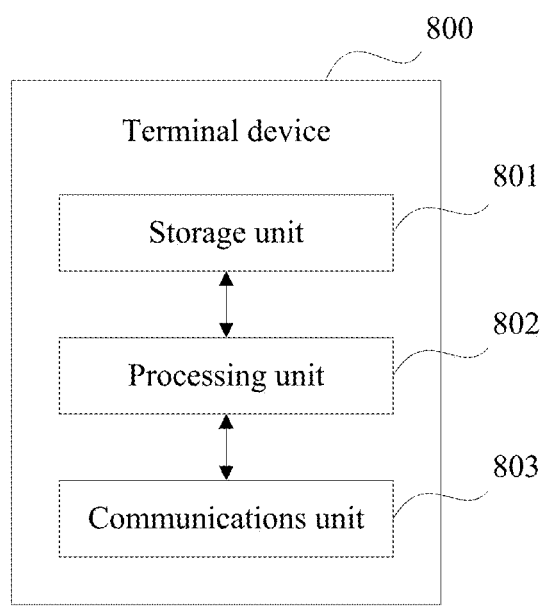
FIG. 8A is a possible schematic diagram of a terminal device according to an embodiment of the present application.

When an integrated unit is used, FIG. 8A shows a possible schematic structural diagram of the terminal device in the foregoing embodiments. The terminal device 800 includes a processing unit 802 and a communications unit 803. The processing unit 802 is configured to control and manage actions of the terminal device 800. For example, the processing unit 802 is configured to support the terminal device 800 in performing step 2 and step 9 in FIG. 1. The processing unit 802 may be further configured to support the terminal device 800 in performing S310 and S340 in FIG. 3, and/or used for other processes of the technology described in this specification. The communications unit 803 is configured to support communication between the terminal device 800 and another network entity, for example, communication between the terminal device 800 and the KGC 120 or the server 130 shown in FIG. 1. The terminal device 800 may further include a storage unit 801, configured to store program code and data of the terminal device 800.

The processing unit 802 may be a processor or a controller. For example, the processing unit 802 may be a central processing unit (CPU), a general purpose processor, a digital signal processor (DSP), an application-specific integrated circuit (ASIC), a field programmable gate array (FPGA) or other programmable logic device, a transistor logic device, a hardware component, or any combination thereof. The processing unit 802 can implement or execute various example logical blocks, modules, and circuits described with reference to content disclosed in the present application. Alternatively, the processor may be a combination of processors implementing a computing function, for example, a combination including one or more microprocessors, or a combination of a DSP and a microprocessor. The communications unit 803 may be a communications interface, a transceiver, a transceiver circuit, or the like. The communications interface is a generic term and may include one or more interfaces. The storage unit 801 may be a memory.

Figure 8B:
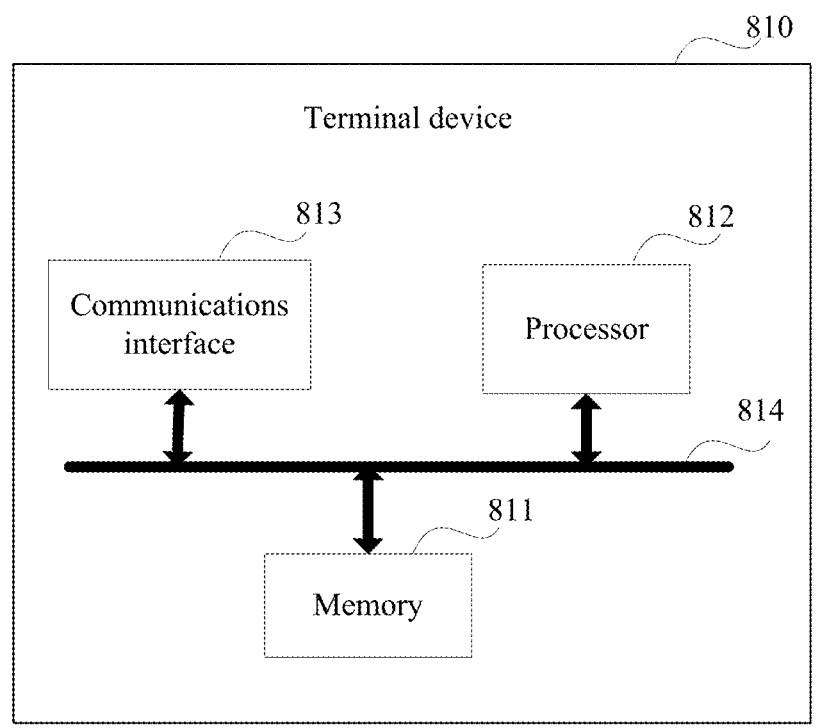
FIG. 8B is another possible schematic diagram of a terminal device according to an embodiment of the present application.

When the processing unit 802 is a processor, the communications unit 803 is a communications interface, and the storage unit 801 is a memory, the terminal device in this embodiment of the present application may be a terminal device shown in FIG. 8B.

Referring to FIG. 8B, the terminal device 810 includes a processor 812, a communications interface 813, and a memory 811. Optionally, the terminal device 810 may further include a bus 814. The communications interface 813, the processor 812, and the memory 811 may be connected to each other by using the bus 814. The bus 814 may be a Peripheral Component Interconnect (PCI) bus, an Extended Industry Standard Architecture (EISA) bus, or the like. The bus 814 may be classified into an address bus, a data bus, a control bus, and the like. For ease of representation, the bus is represented by using only one bold line in FIG. 8B, which, however, does not mean that there is only one bus or one type of bus.

It can be clearly understood by a person skilled in the art that, for the purpose of convenient and brief description, for detailed working processes of the foregoing apparatus and units, reference may be made to the corresponding processes in the foregoing method embodiments. Details are not described herein again.

Therefore, the terminal device provided in this embodiment of the present application may generate the first public key and the first private key, where the first public key is used to encrypt data, and the first private key is used to decrypt the data that is encrypted by using the first public key. The terminal device sends the first public key to the KGC, so that the KGC or the server generates the transform key according to the first public key, where the first public key is nested within the transform key. Therefore, after the server processes, by using the transform key, the ciphertext that is encrypted based on the attribute structure of the terminal device, what is generated is the ciphertext that is encrypted by using the first public key. The terminal device stores the first private key paired with the first public key. After receiving a partially decrypted ciphertext sent by the server, the terminal device may perform decryption according to the first private key and a decryption algorithm, to generate a plaintext. Because the first private key is stored in the terminal device all the time, and the first private key does not need to be sent to another device, a secure channel does not need to be used in the data processing method in this embodiment of the present application. In addition, because what is obtained after the server processes the first data is still a ciphertext, another device is unable to obtain the final plaintext even if the server conspires with the another device. Therefore, the data processing method in this embodiment of the present application imposes no requirement on security performance of the server. Moreover, the first private key in this embodiment of the present application may be a constant, and the terminal device only needs to perform one exponentiation operation when performing a decryption operation according to the first private key, to obtain the plaintext. This avoids a bilinear pairing operation for which a large quantity of computing resources are consumed in another technical solution, thereby reducing a requirement for a processing capability of the terminal device, and improving resource utilization of the terminal device.

Figure 9A:
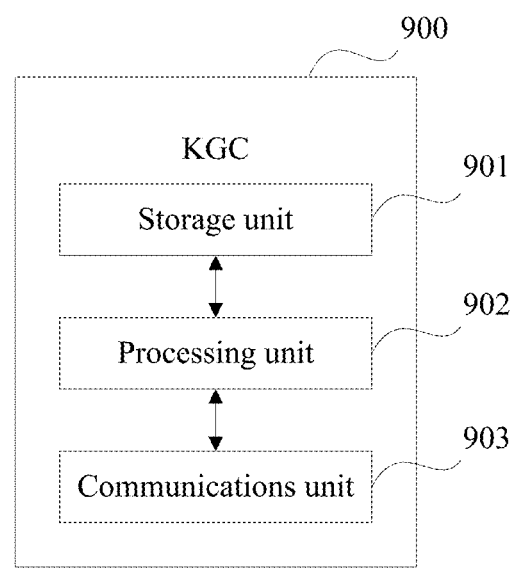
FIG. 9A is a possible schematic diagram of a KGC according to an embodiment of the present application.

When an integrated unit is used, FIG. 9A shows a possible schematic structural diagram of the KGC in the foregoing embodiments. The KGC 900 includes a processing unit 902 and a communications unit 903. The processing unit 902 is configured to control and manage actions of the KGC 900. For example, the processing unit 902 is configured to support the KGC 900 in performing step 1, step 3, step 4, and step 10 in FIG. 1. The processing unit 902 may be further configured to support the KGC 900 in performing S420 in FIG. 4, and/or used for other processes of the technology described in this specification. The communications unit 903 is configured to support communication between the KGC 900 and another network entity, for example, communication between the KGC 900 and the terminal device 110 or the server 130 shown in FIG. 1. The KGC 900 may further include a storage unit 901, configured to store program code and data of the KGC 900.

The processing unit 902 may be a processor or a controller. For example, the processing unit 902 may be a central processing unit CPU, a general purpose processor, a DSP, an ASIC, an FPGA or other programmable logic device, a transistor logic device, a hardware component, or any combination thereof. The processing unit 902 can implement or execute various example logical blocks, modules, and circuits described with reference to content disclosed in the present application. Alternatively, the processor may be a combination of processors implementing a computing function, for example, a combination including one or more microprocessors, or a combination of a DSP and a microprocessor. The communications unit 903 may be a communications interface, a transceiver, a transceiver circuit, or the like. The communications interface is a generic term and may include one or more interfaces. The storage unit 901 may be a memory.

Figure 9B:
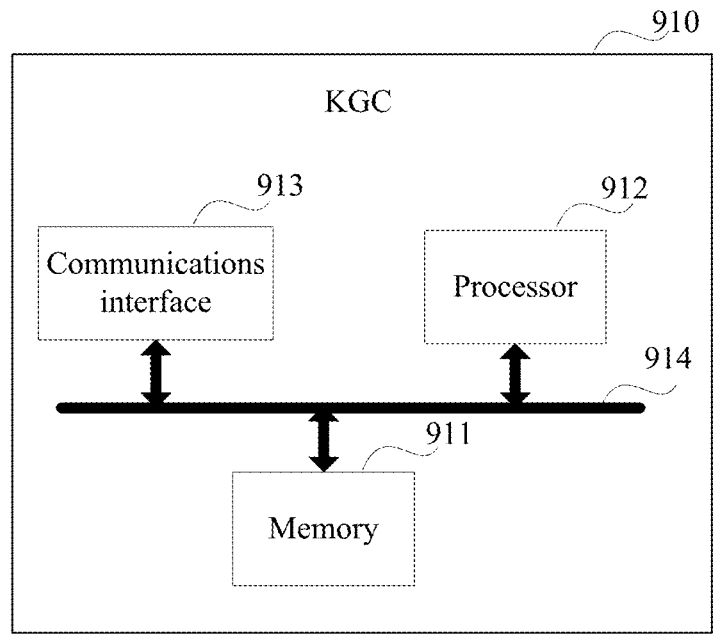
FIG. 9B is another possible schematic diagram of a KGC according to an embodiment of the present application.

When the processing unit 902 is a processor, the communications unit 903 is a communications interface, and the storage unit 901 is a memory, the KGC in this embodiment of the present application may be a KGC shown in FIG. 9B.

Referring to FIG. 9B, the KGC 910 includes a processor 912, a communications interface 913, and a memory 911. Optionally, the KGC 910 may further include a bus 914. The communications interface 913, the processor 912, and the memory 911 may be connected to each other by using the bus 914. The bus 914 may be a PCI bus, an EISA bus, or the like. The bus 914 may be classified into an address bus, a data bus, a control bus, and the like. For ease of representation, the bus is represented by using only one bold line in FIG. 9B, which, however, does not mean that there is only one bus or one type of bus.

It can be clearly understood by a person skilled in the art that, for the purpose of convenient and brief description, for detailed working processes of the foregoing apparatus and units, reference may be made to the corresponding processes in the foregoing method embodiments. Details are not described herein again.

Therefore, the KGC provided in this embodiment of the present application may generate the second public key based on the first public key and the attribute of the terminal device. The second public key is a public key based on the attribute of the terminal device, and may be used to decrypt data that is encrypted based on the attribute of the terminal device. Because the first public key is nested within the second public key, after the data that is encrypted based on the attribute of the terminal device is processed by using the second public key, generated data is the ciphertext that is encrypted based on the first public key. The terminal device may use the first private key stored in the terminal device, to decrypt the ciphertext that is encrypted based on the first public key. The first private key is a key paired with the first public key, and may be used to decrypt the data that is encrypted based on the first public key. In this embodiment of the present application, the attribute information of the terminal device may be specific identity information of the terminal device, and the KGC may further generate the second public key according to the first public key and an attribute set of the terminal device.

Because the first private key is stored in the terminal device all the time, and the first private key does not need to be sent to another device, a secure channel does not need to be used in the data processing method in this embodiment of the present application. In addition, because what is obtained after the server processes the first data is still a ciphertext, another device is unable to obtain the final plaintext even if the server conspires with the another device. Therefore, the data processing method in this embodiment of the present application imposes no requirement on security performance of the server. Moreover, the first private key in this embodiment of the present application may be a constant, and the terminal device only needs to perform one exponentiation operation when performing a decryption operation according to the first private key, to obtain the plaintext. This avoids a bilinear pairing operation for which a large quantity of computing resources are consumed in another technical solution, thereby reducing a requirement for a processing capability of the terminal device, and improving resource utilization of the terminal device.

Figure 10A:
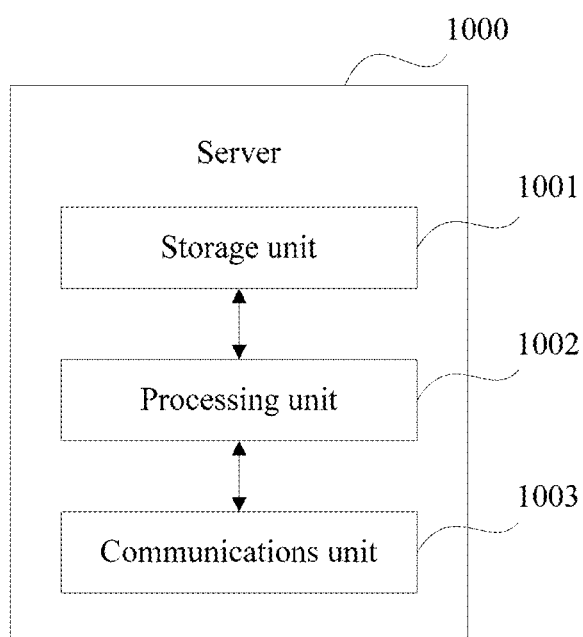
FIG. 10A is a possible schematic diagram of a server according to an embodiment of the present application.

When an integrated unit is used, FIG. 10A shows a possible schematic structural diagram of the server in the foregoing embodiments. The server 1000 includes a processing unit 1002 and a communications unit 1003. The processing unit 1002 is configured to control and manage actions of the server 1000. For example, the processing unit 1002 is configured to support the server 1000 in performing step 7 and step 8 in FIG. 1. The processing unit 1002 may be further configured to support the server 1000 in performing S530 in FIG. 5, and/or used for other processes of the technology described in this specification. The communications unit 1003 is configured to support communication between the server 1000 and another network entity, for example, communication between the server 1000 and the terminal device 110 or the KGC 120 shown in FIG. 1. The server 1000 may further include a storage unit 1001, configured to store program code and data of the server 1000.

The processing unit 1002 may be a processor or a controller. For example, the processing unit 1002 may be a central processing unit CPU, a general purpose processor, a DSP, an ASIC, an FPGA or other programmable logic device, a transistor logic device, a hardware component, or any combination thereof. The processing unit 1002 can implement or execute various example logical blocks, modules, and circuits described with reference to content disclosed in the present application. Alternatively, the processor may be a combination of processors implementing a computing function, for example, a combination including one or more microprocessors, or a combination of a DSP and a microprocessor. The communications unit 1003 may be a communications interface, a transceiver, a transceiver circuit, or the like. The communications interface is a generic term and may include one or more interfaces. The storage unit 1001 may be a memory.

Figure 10B:
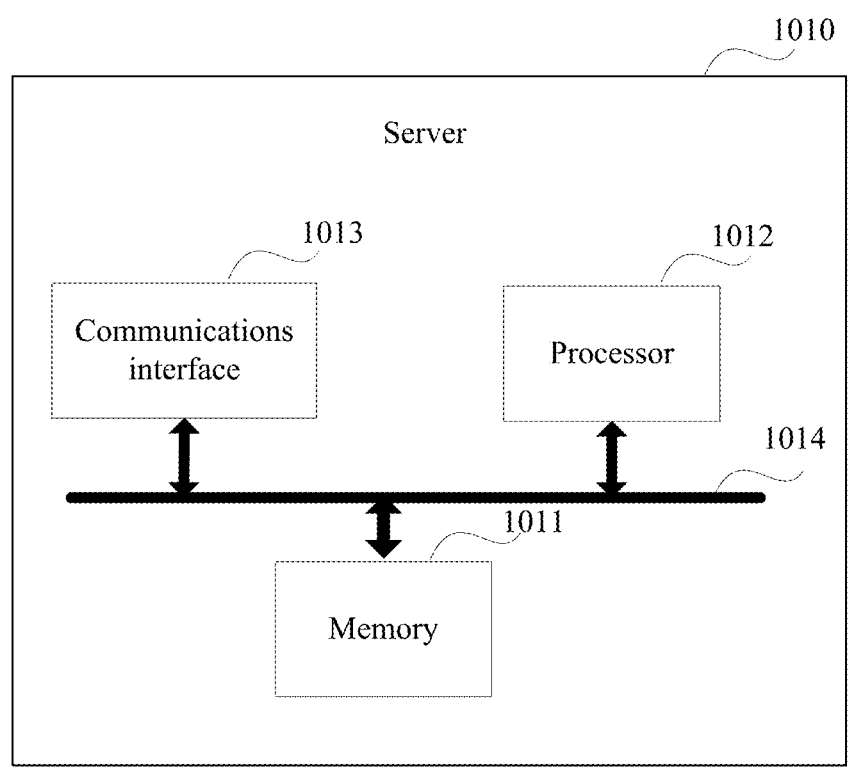
FIG. 10B is another possible schematic diagram of a server according to an embodiment of the present application.

When the processing unit 1002 is a processor, the communications unit 1003 is a communications interface, and the storage unit 1001 is a memory, the server in this embodiment of the present application may be a server shown in FIG. 10B.

Referring to FIG. 10B, the server 1010 includes a processor 1012, a communications interface 1013, and a memory 1011. Optionally, the server 1010 may further include a bus 1014. The communications interface 1013, the processor 1012, and the memory 1011 may be connected to each other by using the bus 1014. The bus 1014 may be a PCI bus, an EISA bus, or the like. The bus 914 may be classified into an address bus, a data bus, a control bus, and the like. For ease of representation, the bus is represented by using only one bold line in FIG. 10B, which, however, does not mean that there is only one bus or one type of bus.

It can be clearly understood by a person skilled in the art that, for the purpose of convenient and brief description, for detailed working processes of the foregoing apparatus and units, reference may be made to the corresponding processes in the foregoing method embodiments. Details are not described herein again.

In this embodiment of the present application, the second public key is a public key generated by the KGC based on the first public key and the attribute information of the terminal device; the second public key is a public key based on the attribute of the terminal device, and may be used to decrypt data that is encrypted based on the attribute of the terminal device. Because the first public key is nested within the second public key, after the data that is encrypted based on the attribute of the terminal device is processed by using the second public key, generated data is the ciphertext that is encrypted based on the first public key. The terminal device may use the first private key stored in the terminal device, to decrypt the second data. The first private key is a key generated by the terminal device, and may be used to decrypt the data that is encrypted based on the first public key.

Because the first private key is stored in the terminal device all the time, and the first private key does not need to be sent to another device, a secure channel does not need to be used in this embodiment of the present application. In addition, because what is obtained after the server processes the first data is still a ciphertext, another device is unable to obtain the final plaintext even if the server conspires with the another device. Therefore, this embodiment of the present application imposes no requirement on security performance of the server. Moreover, the first private key in this embodiment of the present application may be a constant, and the terminal device only needs to perform one exponentiation operation when performing a decryption operation according to the first private key, to obtain the plaintext. This avoids a bilinear pairing operation for which a large quantity of computing resources are consumed in another technical solution, thereby reducing a requirement for a processing capability of the terminal device, and improving resource utilization of the terminal device.

Sequence numbers of the processes do not mean execution sequences in the embodiments of the present application. The execution sequences of the processes should be determined according to functions and internal logic of the processes, and should not be construed as any limitation on the implementation processes of the embodiments of the present application.

In addition, the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

The steps of the methods or algorithms described with reference to content disclosed in the embodiments of the present application may be implemented by hardware, or may be implemented by a processor executing a software instruction. The software instruction may include a corresponding software module. The software module may be stored in a random access memory (RAM), a flash memory, a read-only memory (ROM), an erasable programmable read-only memory (EPROM), an electrically erasable programmable read-only memory (EEPROM), a register, a hard disk, a removable hard disk, a compact disc read-only memory (CD-ROM), or any other form of storage medium known in the prior art. For example, a storage medium is coupled to a processor, so that the processor can read information from the storage medium or write information into the storage medium. Certainly, the storage medium may alternatively be a component of the processor. The processor and the storage medium may be located in an ASIC. In addition, the ASIC may be located in a terminal device, a KGC, or a server. Certainly, the processor and the storage medium may be located in a terminal device, a KGC, or a server as discrete components.

A person skilled in the art should be aware that in the foregoing one or more examples, functions described in the present application may be implemented by hardware, software, firmware, or any combination thereof. When the functions are implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The objectives, technical solutions, and beneficial effects of the present application are further described in detail in the foregoing specific implementations. It should be understood that the foregoing descriptions are merely specific implementations of the present application, and are not intended to limit the protection scope of the present application. Any modification, equivalent replacement, or improvement made based on the technical solutions of the present application shall fall within the protection scope of the present application.

What is claimed is:

1. A data processing system, comprising:
   a terminal device,
   a network entity that includes a key generation center (KGC), and
   a server,
   wherein:
   the terminal device is configured to generate a first public key and a first private key;
   the terminal device is configured to send the first public key to the KGC;
   the KGC is configured to: receive the first public key from the terminal device, and generate a second public key according to a system parameter, a master key, internal state information of the KGC, the first public key, and attribute information of the terminal device, wherein the system parameter is public information related to the KGC, and the master key is a private key of the KGC;
   the KGC is configured to send the second public key to the server;
   the server is configured to receive the second public key sent by the KGC;
   the server is configured to obtain first data, wherein the first data is data that is encrypted based on an attribute structure of the terminal device;
   the server is configured to transform the first data into second data according to the second public key;
   the server is configured to send the second data to the terminal device; and
   the terminal device is configured to: receive the second data sent by the server, and decrypt the second data according to the first private key.

2. The system according to claim 1, wherein:
   the terminal device is configured to generate the first public key and the first private key according to the system parameter and an identity parameter, wherein the system parameter is the public information related to the KGC, and the identity parameter is identification information of the terminal device.

3. The system according to claim 1, wherein:
the KGC is further configured to generate a transform key according to the second public key and key update information;
the KGC is further configured to:
in response to the key update information indicating that the terminal device is revoked, generate an error prompt according to the second public key and the key update information, and send the error prompt to the server; or
in response to the key update information indicating that the terminal device is not revoked, generate the transform key according to the second public key and the key update information, and send the transform key to the server; and
the server is further configured to transform the first data into the second data according to the transform key.

4. The system according to claim 1, wherein:
the server is further configured to receive key update information from the KGC, wherein the key update information is used to indicate whether the terminal device is revoked; and
the server is further configured to:
in response to the key update information indicating that the terminal device is revoked, generate the error prompt according to the second public key and the key update information; or
in response to the key update information indicating that the terminal device is not revoked, generate a transform key according to the second public key and the key update information, and transform the first data into the second data according to the transform key.

5. The system according to claim 1, wherein the first public key and the first private key are a pair of a public key and a private key that match each other in a public-key cryptographic algorithm.

6. A data processing method, wherein the method comprises:
generating, by a terminal device, a first public key and a first private key;
sending, by the terminal device, the first public key to a network entity that includes a key generation center (KGC), so that a server or the KGC generates a transform key according to the first public key;
receiving, by the terminal device, second data sent by the server, wherein the second data is data that is generated after the server processes first data according to the transform key, and the first data is data that is encrypted based on an attribute structure of the terminal device and that is obtained by the server; and
decrypting, by the terminal device, the second data according to the first private key.

7. The method according to claim 6, wherein the sending, by the terminal device, the first public key comprises:
sending, by the terminal device, the first public key and certification information to the KGC, wherein the certification information indicates that the terminal device stores the first private key.

8. The method according to claim 6, wherein the generating, by the terminal device, the first public key and the first private key comprises:
generating, by the terminal device, the first public key and the first private key according to a system parameter, wherein the system parameter is public information related to the KGC.

9. The method according to claim 8, wherein the decrypting, by the terminal device, the second data according to the first private key comprises:
decrypting, by the terminal device, the second data according to the system parameter and the first private key.

10. The method according to claim 6, wherein the first public key and the first private key are a pair of a public key and a private key that match each other in a public-key cryptographic algorithm.

11. A data processing method, wherein the method comprises:
receiving, by a key generation center (KGC) included in a network entity, a first public key from a terminal device;
generating, by the KGC, the second public key according to a system parameter, a master key, the first public key, attribute information of the terminal device, and internal state information of the KGC, wherein the system parameter is public information related to the KGC, and the master key is a private key of the KGC; and
sending, by the KGC, the second public key or a transform key to a server, wherein the transform key is generated according to the second public key and key update information.

12. The method according to claim 11, wherein before the generating, by the KGC, the second public key, the method further comprises:
receiving, by the KGC, certification information from the terminal device, wherein the certification information is used to indicate that the terminal device stores a first private key.

13. The method according to claim 11, further comprising:
generating, by the KGC, the transform key according to the second public key and key update information, wherein generating, by the KGC, the transform key comprises:
generating, by the KGC, the transform key according to the second public key, the key update information, the system parameter, and an identity parameter, wherein the key update information indicates that the terminal device is not revoked.

14. The method according to claim 11, wherein the first public key and the first private key are a pair of a public key and a private key that match each other in a public-key cryptographic algorithm.

15. A data processing method, wherein the method comprises:
receiving, by a server, a second public key from a key generation center (KGC) included in a network entity, wherein the second public key is generated by the KGC according to a first public key, attribute information of a terminal device, a system parameter, a master key, and internal state information of the KGC, wherein the system parameter is public information related to the KGC, the master key is a private key of the KGC, and the first public key is a public key of the terminal device;
obtaining, by the server, first data, wherein the first data is data that is encrypted based on the attribute structure of the terminal device;
transforming, by the server, the first data into second data according to the second public key; and
sending, by the server, the second data to the terminal device, so that the terminal device decrypts the second data according to a first private key.

16. The method according to claim 15, wherein after the receiving, by the server, the second public key, the method further comprises:
  receiving, by the server, key update information from the KGC, wherein the key update information indicates whether the terminal device is revoked;
  wherein the transforming, by the server, the first data into the second data according to the second public key comprises:
    in response to the key update information indicating that the terminal device is not revoked, generating, by the server, the transform key according to the second public key and the key update information; and
    transforming, by the server, the first data into the second data according to the transform key.

17. The method according to claim 16, wherein the generating, by the server, the transform key according to the second public key and the key update information comprises:
  generating, by the server, the transform key according to the second public key, the key update information, the system parameter, and an identity parameter, wherein the system parameter is the public information related to the KGC, and the identity parameter is identification information of the terminal device or a user of the terminal device.

18. The method according to claim 17, wherein the transforming, by the server, the first data into the second data according to the transform key comprises:
  transforming, by the server, the first data into the second data according to one or more of the transform key, the system parameter, the attribute information of the terminal device, the identity parameter, or a time parameter, wherein the system parameter is the public information related to the KGC, the identity parameter is the identification information of the terminal device or the user of the terminal device, and the time parameter is used to indicate a time during which the server is allowed to use the transform key.

19. The method according to claim 15, wherein the first public key and the first private key are a pair of a public key and a private key that match each other in a public-key cryptographic algorithm.

\* \* \* \* \*